US010455616B2

(12) United States Patent
Huang et al.

(10) Patent No.: US 10,455,616 B2
(45) Date of Patent: Oct. 22, 2019

(54) INTERFERENCE MANAGEMENT TECHNIQUES FOR FULL-DUPLEX WIRELESS COMMUNICATIONS

(71) Applicant: INTEL IP CORPORATION, Santa Clara, CA (US)

(72) Inventors: Po-Kai Huang, San Jose, CA (US); Robert Stacey, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 161 days.

(21) Appl. No.: 15/309,433

(22) PCT Filed: Jun. 5, 2014

(86) PCT No.: PCT/US2014/040985
§ 371 (c)(1),
(2) Date: Nov. 7, 2016

(87) PCT Pub. No.: WO2015/187160
PCT Pub. Date: Dec. 10, 2015

(65) Prior Publication Data
US 2017/0150526 A1    May 25, 2017

(51) Int. Cl.
*H04W 74/08* (2009.01)
*H04W 52/16* (2009.01)
(Continued)

(52) U.S. Cl.
CPC ...... *H04W 74/0816* (2013.01); *H04B 17/318* (2015.01); *H04L 5/0055* (2013.01);
(Continued)

(58) Field of Classification Search
CPC ............ H04W 74/0816; H04W 52/16; H04W 52/367; H04B 17/318; H04L 5/0055
See application file for complete search history.

(56) References Cited

U.S. PATENT DOCUMENTS

2005/0135284 A1    6/2005 Nanda et al.
2008/0076466 A1    3/2008 Larsson
(Continued)

FOREIGN PATENT DOCUMENTS

CN    101198142 A    6/2008
TW    201419915 A    5/2014

OTHER PUBLICATIONS

U.S. Appl. No. 61/878,567, filed Sep. 16, 2013 corresponding to US 2015/0078215 A1. (Year: 2013).*
(Continued)

*Primary Examiner* — Melvin C Marcelo

(57) ABSTRACT

Interference management techniques for full-duplex wireless communications are described. In one embodiment, for example, an apparatus may comprise logic, at least a portion of which is in hardware, the logic to initiate a downlink (DL) transmission procedure for sending a DL data transmission, and during the DL transmission procedure, send an interference-contingent uplink (UL) transmission invitation identifying a destination of the DL data transmission and begin receiving a UL data transmission in response to the interference-contingent UL transmission invitation. Other embodiments are described and claimed.

23 Claims, 11 Drawing Sheets

(51) Int. Cl.
 *H04B 17/318* (2015.01)
 *H04L 5/00* (2006.01)
 *H04W 52/36* (2009.01)

(52) U.S. Cl.
 CPC ......... *H04W 52/16* (2013.01); *H04W 52/367* (2013.01); *H04W 74/085* (2013.01)

(56) References Cited

U.S. PATENT DOCUMENTS

| | | |
|---|---|---|
| 2009/0311963 A1 | 12/2009 | Haverty |
| 2010/0195543 A1 | 8/2010 | Jung et al. |
| 2012/0201153 A1 | 9/2012 | Bharadia et al. |
| 2013/0194984 A1 | 8/2013 | Cheng et al. |
| 2013/0229952 A1 | 9/2013 | Koskinen et al. |
| 2013/0301487 A1 | 11/2013 | Khandani |
| 2015/0078215 A1* | 3/2015 | Zhou ................ H04L 5/003 370/277 |
| 2016/0344532 A1* | 11/2016 | Bhat .................... H04L 5/14 |
| 2017/0195107 A1* | 7/2017 | Liu .................. H04B 7/0452 |
| 2018/0091283 A1* | 3/2018 | Wang ................. H04L 5/1461 |

OTHER PUBLICATIONS

International Search Report, dated Feb. 11, 2015, Application No. PCT/US2014/040985, Filed Date: Jun. 5, 2014, pp. 3.

\* cited by examiner

INTERFERENCE MANAGEMENT TECHNIQUES FOR FULL-DUPLEX WIRELESS COMMUNICATIONS

CROSS-REFERENCE TO RELATED APPLICATIONS

This application is a national stage application claiming the benefit of and priority to International Application No. PCT/US2014/040985 entitled "INTERFERENCE MANAGEMENT TECHNIQUES FOR FULL-DUPLEX WIRELESS COMMUNICATIONS" filed Jun. 5, 2014, which is hereby incorporated by reference in its entirety.

TECHNICAL FIELD

Embodiments herein generally relate to wireless communications between devices in wireless networks.

BACKGROUND

Recent developments in wireless network communications have introduced the possibility of access points and/or other devices performing full-duplex wireless communications, according to which such devices may transmit and receive data at the same time. One potential benefit of implementing full-duplex techniques may be an increase in area throughput. For example, a full-duplex access point in a Wi-Fi network may potentially increase area throughput by sending data to a first wireless station at the same time that it receives data from a second wireless station, rather than waiting until it finishes sending data to the first wireless station before receiving data from the second wireless station. However, the area throughput advantages of full-duplex communications may depend on the concurrent communications both being properly received at their respective destinations. For example, if the data that the aforementioned full-duplex access point receives from the second wireless station causes sufficient interference at the first wireless station to preclude proper receipt of the data sent by the full-duplex access point, area throughput may actually be reduced rather than increased. In order to enable the efficient use of full-duplex capabilities, interference management techniques for full-duplex wireless communications may be desirable.

DETAILED DESCRIPTION

Figure 1:
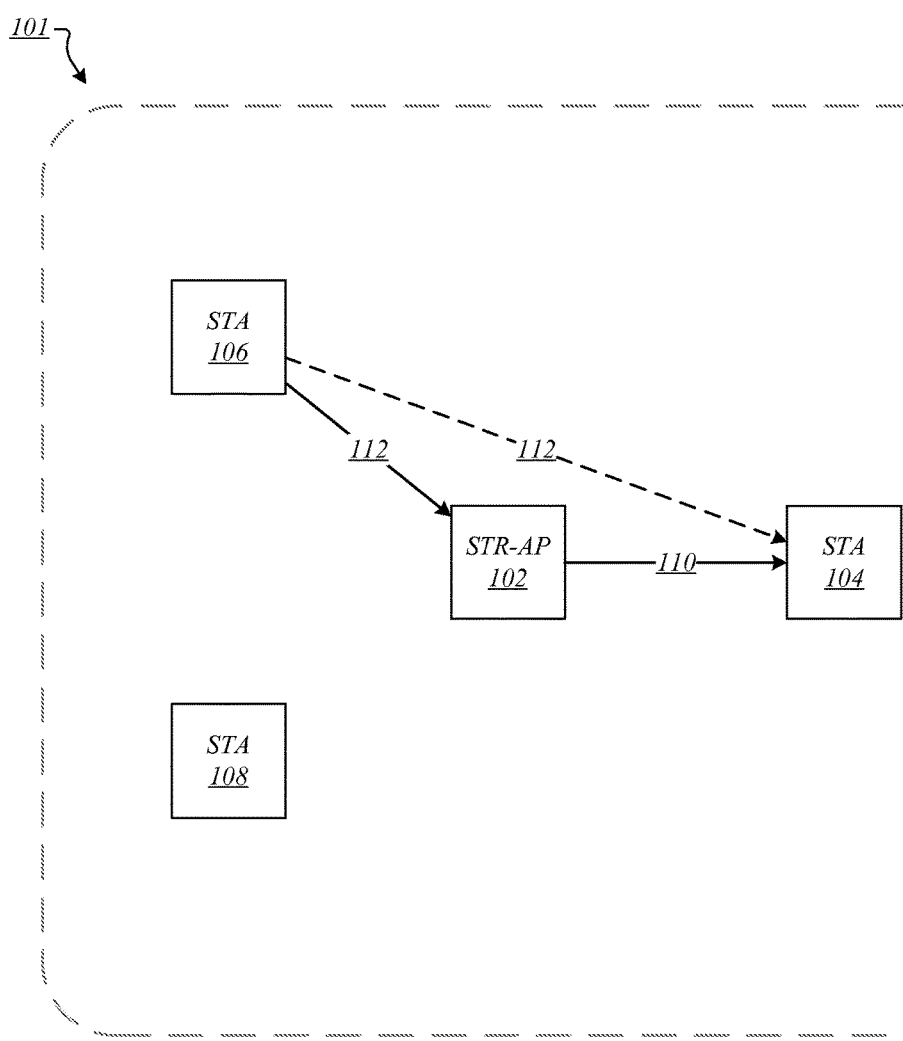
FIG. 1 illustrates an embodiment of an operating environment.

Various embodiments may be generally directed to interference management techniques for full-duplex wireless communications. In one embodiment, for example, an apparatus may comprise logic, at least a portion of which is in hardware, the logic to initiate a downlink (DL) transmission procedure for sending a DL data transmission, and during the DL transmission procedure, send an interference-contingent uplink (UL) transmission invitation identifying a destination of the DL data transmission and begin receiving a UL data transmission in response to the interference-contingent UL transmission invitation. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Embodiments herein are generally directed to wireless communications systems. Some embodiments are particularly directed to wireless communications performed according to one or more wireless communications standards. For example, various embodiments may involve wireless communications between devices in a wireless local area network (WLAN) according to one or more Institute of Electrical and Electronics Engineers (IEEE) 802.11 standards ("Wi-Fi standards"), such as the IEEE 802.11-2012 Standard, published Mar. 29, 2012, titled "Part 11: Wireless LAN Medium Access Control (MAC) and Physical Layer (PHY) Specifications." Some embodiments may involve wireless communications performed according to one or more standards developed by the IEEE High-Efficiency WLAN (HEW) Study Group.

Various embodiments may involve wireless communications performed according to other wireless communications standards, such as 3G and/or 4G wireless standards. Examples of 3G and 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited to these examples.

For ease of explanation, the following description employs various terms that may often be associated with IEEE 802.11 networks, such as "wireless station" and "access point." It is to be understood that the use of these terms is not intended to limit the embodiments to 802.11 networks. The described techniques may be utilized in other types of networks in various embodiments, such as networks of the various other types mentioned above and/or networks of types other than those mentioned above.

FIG. 1 illustrates an example of an operating environment 100 such as may be representative of various embodiments. As shown in FIG. 1, example operating environment 100 includes a WLAN 101 that comprises a simultaneous transmission and reception (STR)-capable access point (STR-AP) and wireless stations (STAs) 104, 106, and 108. STR-AP 102 may comprise an access point that is capable of performing full-duplex wireless communications. In some embodiments, STAs 104, 106, and 108 may wirelessly communicate with each other via STR-AP 102, according to one or more Wi-Fi standards. In some embodiments, WLAN 101 may comprise a High-Efficiency WLAN (HE-WLAN), and STAs 104, 106, and 108 may wirelessly communicate with each other via STR-AP 102 according to one or more High-Efficiency Wi-Fi standards. The embodiments are not limited to these examples, and it is to be understood that various embodiments may comprise different types and/or numbers of devices, and/or may involve wireless communications according to other wireless communications standards.

In various embodiments, in order to increase network throughput, it may be desirable for STR-AP 102 to use its full-duplex capability to receive data from one STA while concurrently sending data to another STA. For example, it may be desirable that while STR-AP 102 sends a downlink (DL) data transmission 110 to STA 104, it also receives an uplink (UL) data transmission from another STA in WLAN 101. In example operating environment 100, STA 106 may wish to send a UL data transmission 112 to STR-AP 102, and STR-AP 102 may be capable of receiving that UL data transmission 112 while sending DL data transmission 110. However, in some embodiments, it may be desirable that account be made for the prospective interference effects of UL data transmission 112 at STA 104. In various embodiments, if UL data transmission 112 would be expected to cause enough interference at STA 104 to prevent STA 104 from properly receiving DL data transmission 110, it may be preferable that STR-AP 102 at least temporarily forgo use of its full-duplex capability, and that STA 106 wait to transmit UL data transmission 112 until after STR-AP 102 has finished transmitting DL data transmission 110. The embodiments are not limited to this example.

Disclosed herein are interference management techniques according to which the use of an STR-capable device's full-duplex capabilities may be controlled based on these types of interference considerations. According to some such techniques, an STR-AP or other STR-capable device may initiate a DL transmission process for sending a DL data transmission to a remote device, and may then invite one or more other remote devices to consider performing UL data transmission to the STR-AP or other STR-capable device while it performs the DL data transmission. The embodiments are not limited in this context.

Figure 2:
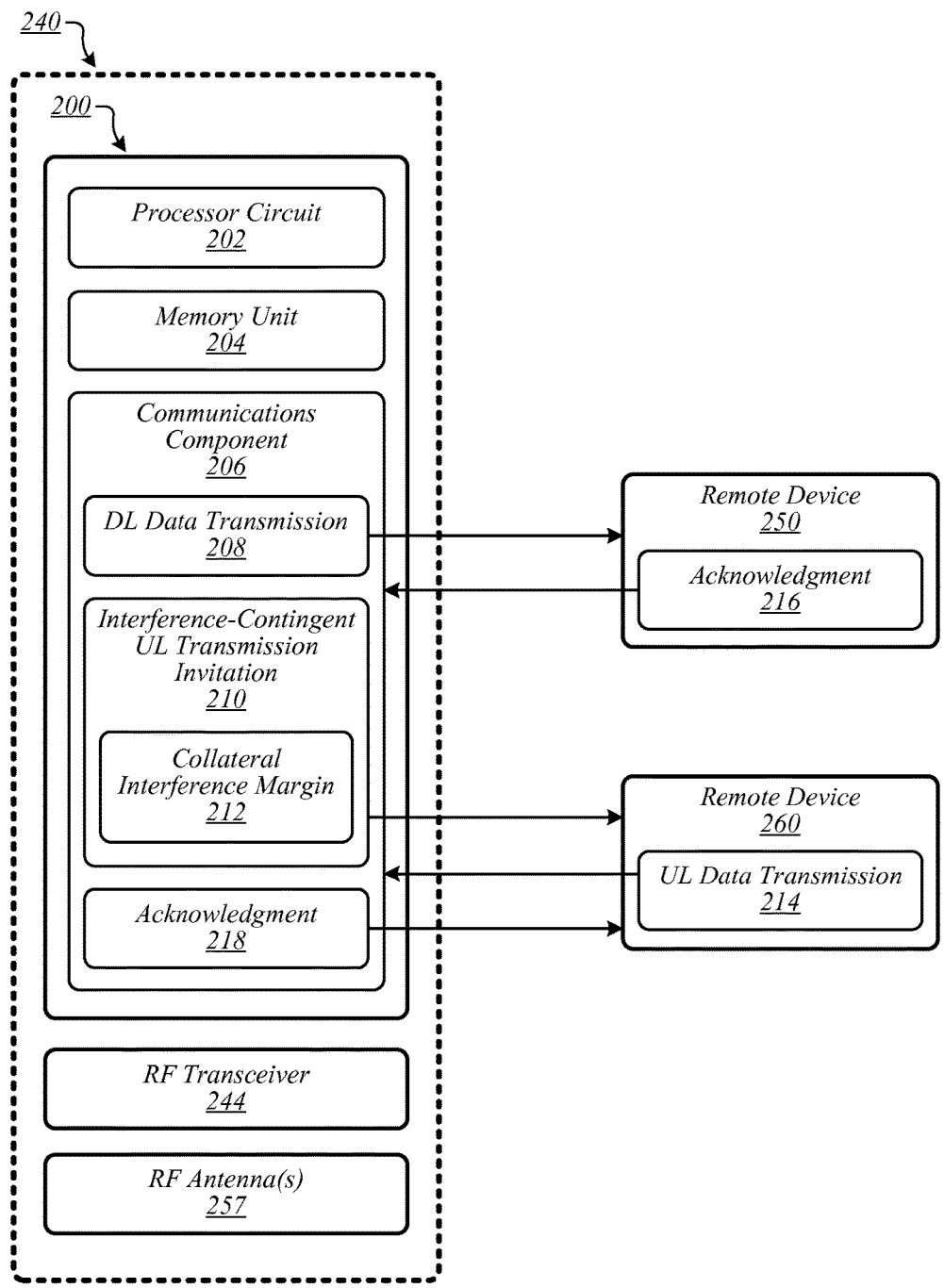
FIG. 2 illustrates an embodiment of a first apparatus and an embodiment of a first system.

FIG. 2 illustrates a block diagram of an apparatus 200 such as may be representative of various embodiments. More particularly, apparatus 200 may be representative of an STR-AP that implements interference management techniques to support full-duplex wireless communications in some embodiments. As shown in FIG. 2, apparatus 200 comprises multiple elements including a processor circuit 202, a memory unit 204, and a communications component 206. The embodiments, however, are not limited to the type, number, or arrangement of elements shown in this figure.

In various embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In some embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

In various embodiments, apparatus 200 may comprise a communications component 206. Communications component 206 may comprise logic, circuitry, and/or instructions operative to send messages to one or more remote devices and/or to receive messages from one or more remote devices. In some embodiments, communications component 206 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

FIG. 2 also illustrates a block diagram of a system 240. System 240 may comprise any of the aforementioned elements of apparatus 200. System 240 may further comprise a radio frequency (RF) transceiver 244. RF transceiver 244 may comprise one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 244 may operate in accordance with one or more applicable standards in any version. The embodiments are not limited in this context.

In some embodiments, system 240 may comprise one or more RF antennas 257. Examples of any particular RF antenna 257 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In various embodiments, RF transceiver 244 may be operative to send and/or receive messages and/or data using one or more RF antennas 257. The embodiments are not limited in this context.

In general operation, apparatus 200 and/or system 240 may be operative to communicate with one or more remote devices within a wireless network. In some embodiments, apparatus 200 and/or system 240 may comprise an STR-AP and the one or more remote devices may comprise one or more STAs. In various embodiments, the wireless network may comprise a WLAN. In some embodiments, the wireless network may comprise an HE-WLAN. The embodiments are not limited in this context.

In various embodiments, apparatus 200 and/or system 240 may have data to send to a remote device 250. In some embodiments, communications component 206 may be operative to initiate a DL transmission procedure for sending that data to the remote device 250. In various embodiments, the DL transmission procedure may involve sending a DL data transmission 208 to the remote device 250. In some embodiments, the DL transmission procedure may involve one or more other operations and/or communications. For example, in various embodiments, communications component 206 may be operative to initiate the DL transmission procedure by sending a request-to-send message (RTS) to the remote device 250, and may receive a clear-to-send message (CTS) from the remote device 250 prior to sending the DL data transmission 208. The embodiments are not limited to this example.

In some embodiments, during the DL transmission procedure, communications component 206 may be operative to send an interference-contingent UL transmission invitation 210 to one or more other remote devices. In various embodiments, interference-contingent UL transmission invitation 210 may comprise logic, information, and/or instructions indicating that apparatus 200 and/or system 240 is an STR-capable device. In some embodiments, interference-contingent UL transmission invitation 210 may comprise information identifying remote device 250 as the destination of DL data transmission 208. In various embodiments, interference-contingent UL transmission invitation 210 may identify a specific remote device that is invited to send a UL data transmission to apparatus 200 and/or system 240 during transmission of DL data transmission 208. In some other embodiments, interference-contingent UL transmission invitation 210 may comprise a non-specific invitation for consideration by a plurality of remote devices. In various embodiments, interference-contingent UL transmission invitation 210 may be comprised within an RTS. In some other embodiments, interference-contingent UL transmission invitation 210 may be comprised within a data packet. The embodiments are not limited in this context.

In various embodiments, interference-contingent UL transmission invitation 210 may comprise a conditional invitation to perform UL transmission during transmission of DL data transmission 208. More particularly, in some embodiments, the invitation embodied by interference-contingent UL transmission invitation 210 may be contingent upon a determination by the invited device(s) that the collateral interference resulting at remote device 250 from the UL transmission is expected to be small enough that it does not prevent remote device 250 from properly receiving DL data transmission 208. In various embodiments, in order to enable remote devices to determine whether the collateral interference levels that they may expect to cause at remote device 250 will be small enough, communications component 206 may be operative to include a collateral interference margin 212 in interference-contingent UL transmission invitation 210. Collateral interference margin 212 may generally comprise an indication of a level of collateral interference above which remote device 250 may not expect to properly receive DL data transmission 208, or above which the expected odds of remote device 250 properly receiving DL data transmission 208 are below an acceptability threshold. The embodiments are not limited in this context.

In some embodiments, apparatus 200 and/or system 240 may be operative to receive collateral interference margin 212 from remote device 250 prior to initiating the DL transmission procedure. For example, in various embodiments, prior to initiating the DL transmission procedure, apparatus 200 and/or system 240 may be operative to receive collateral interference margin 212 in a data packet or control packet sent by remote device 250. In some other embodiments, apparatus 200 and/or system 240 may be operative to receive collateral interference margin 212 from remote device 250 after initiation of the DL transmission procedure. In still other embodiments, rather than sending collateral interference margin 212 to apparatus 200 and/or system 240, remote device 250 may be operative to directly announce collateral interference margin 212 to neighboring remote devices. For example, in various embodiments, remote device 250 may be operative to announce collateral interference margin 212 in a CTS. In yet other embodiments, collateral interference margin 212 may be announced by a special frame exchange between apparatus 200 and/or system 240 and remote device 250. The embodiments are not limited in this context.

In some embodiments, one or more remote devices may receive interference-contingent UL transmission invitation 210. In various embodiments, a remote device 260 comprised among those one or more remote devices may elect to perform a UL transmission to apparatus 200 and/or system 240 in response to interference-contingent UL transmission invitation 210. In some embodiments, interference-contingent UL transmission invitation 210 may specifically identify the remote device 260 as the device that is invited to perform UL transmission to apparatus 200 and/or system 240 during transmission of DL data transmission 208. In such embodiments, the remote device 260 may elect to perform such UL transmission based on a determination that the collateral interference that it expects to cause at remote device 250 is less than the collateral interference margin 212. In various other embodiments interference-contingent UL transmission invitation 210 may comprise a non-specific invitation, and multiple remote devices may receive interference-contingent UL transmission invitation 210 and determine that the respective levels of collateral interference that they expect to cause at remote device 250 are less than the collateral interference margin 212. In such embodiments, the multiple remote devices may contend for the UL transmission opportunity, and remote device 260 may emerge from that contention process as the recipient of the UL transmission opportunity. For example, with reference to FIG. 1, STAs 106 and 108 may contend for the opportunity to send UL data transmission 112 to STR-AP 102, and STA 106 may receive that transmission opportunity and may comprise an example of remote device 260 of FIG. 2. The embodiments are not limited in this context.

In some embodiments, having elected to perform UL transmission to apparatus 200 and/or system 240 in response to interference-contingent UL transmission invitation 210, remote device 260 may send UL data transmission 214 to apparatus 200 and/or system 240. More particularly, remote device 260 may begin sending UL data transmission 214 to apparatus 200 and/or system 240 while communications component 206 is still sending DL data transmission 208 to remote device 250. As such, during the DL transmission procedure according to which it sends DL data transmission 208 to remote device 250, communications component 206 may be operative to receive UL data transmission 214 from remote device 260. The embodiments are not limited in this context.

In various embodiments, once it finishes receiving DL data transmission 208, remote device 250 may be operative to send an acknowledgment 216 to apparatus 200 and/or system 240 in order to acknowledge receipt of DL data transmission 208. Similarly, once it finishes receiving UL data transmission 214, communications component 206 may be operative to send an acknowledgement 218 to remote device 260 to acknowledge receipt of UL data transmission 214. In some embodiments, communications component 206 may be operative to concurrently receive acknowledgment 216 from remote device 250 and send acknowledgment 218 to remote device 260. The embodiments are not limited in this context.

Figure 3:
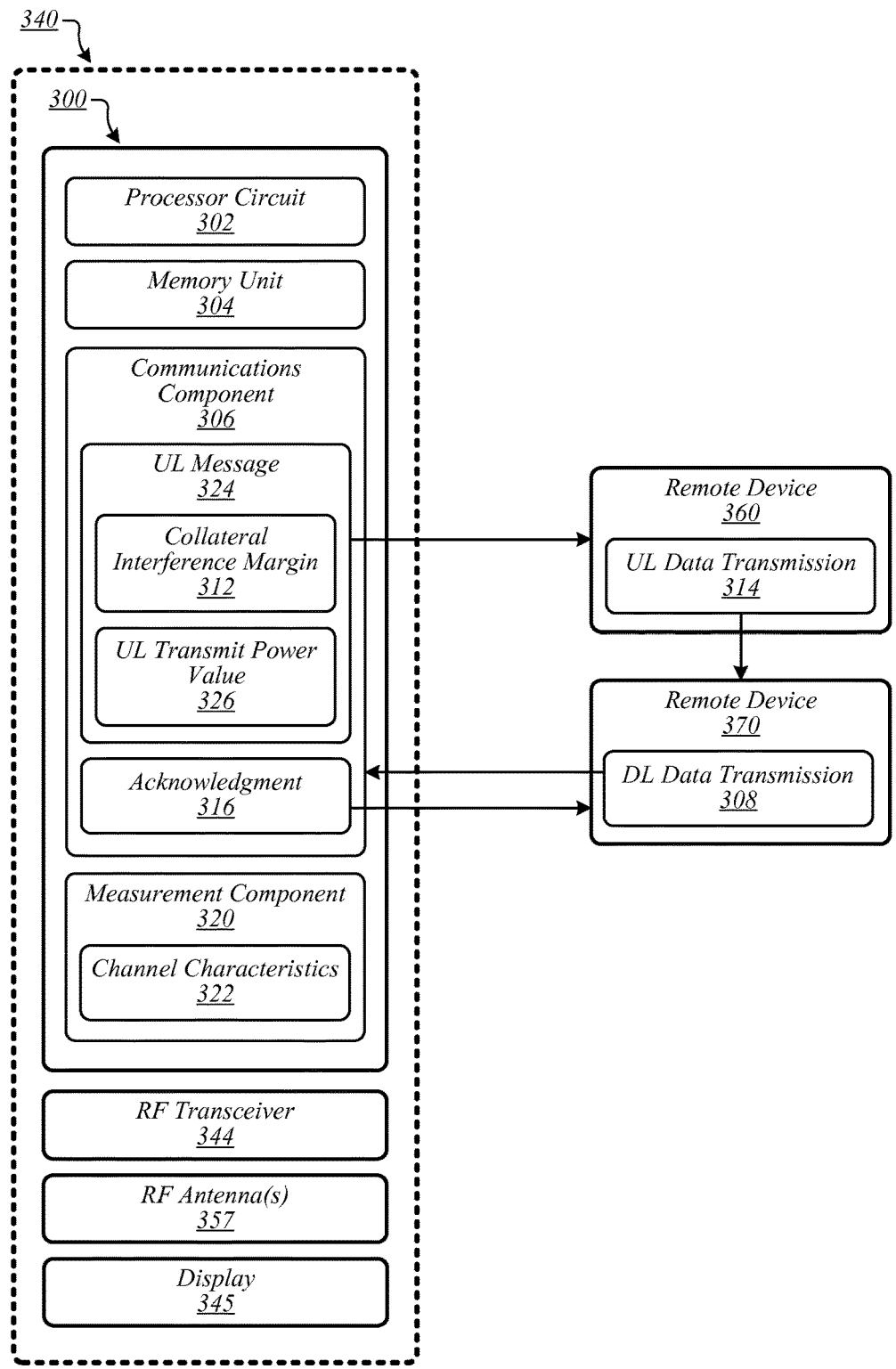
FIG. 3 illustrates an embodiment of a second apparatus and an embodiment of a second system.

FIG. 3 illustrates a block diagram of an apparatus 300 such as may be representative of various embodiments. More particularly, apparatus 300 may be representative of a STA that implements interference management techniques to support full-duplex wireless communications in some embodiments. For example, apparatus 300 may be representative of remote device 250 of FIG. 2. As shown in FIG. 3, apparatus 300 comprises multiple elements including a processor circuit 302, a memory unit 304, a communications component 306, and a measurement component 320. The embodiments, however, are not limited to the type, number, or arrangement of elements shown in this figure.

In various embodiments, apparatus 300 may comprise processor circuit 302. Processor circuit 302 may be implemented using any processor or logic device, and may be the same as or similar to processor circuit 202 of FIG. 2. The embodiments are not limited in this context.

In some embodiments, apparatus 300 may comprise or be arranged to communicatively couple with a memory unit 304. Memory unit 304 may be implemented using any machine-readable or computer-readable media capable of storing data, including both volatile and non-volatile memory, and may be the same as or similar to memory unit 204 of FIG. 2. The embodiments are not limited in this context.

In various embodiments, apparatus 300 may comprise a communications component 306. Communications component 306 may comprise logic, circuitry, and/or instructions operative to send messages to one or more remote devices and/or to receive messages from one or more remote devices, and may be the same as or similar to communications component 206 of FIG. 2. The embodiments are not limited in this context.

In some embodiments, apparatus 300 may comprise a measurement component 320. Measurement component 320 may comprise logic, circuitry, and/or instructions operative to measure one or more characteristics of one or more messages exchanged between communications component 306 and one or more remote devices. In various embodiments, measurement component 320 may be operative to measure received signal strengths of one or more messages received by communications component 306. The embodiments are not limited in this context.

FIG. 3 also illustrates a block diagram of a system 340. System 340 may comprise any of the aforementioned elements of apparatus 300. System 340 may further comprise a radio frequency (RF) transceiver 344. RF transceiver 344 may comprise one or more radios capable of transmitting and receiving signals using various suitable wireless communications techniques, and may be the same as or similar to RF transceiver 244 of FIG. 2. The embodiments are not limited in this context.

In some embodiments, system 340 may comprise one or more RF antennas 357. Examples of any particular RF antenna 357 may include, without limitation, any of the examples previously mentioned with respect to RF antenna(s) 257 of FIG. 2. In various embodiments, RF transceiver 344 may be operative to send and/or receive messages and/or data using one or more RF antennas 357. The embodiments are not limited in this context.

In various embodiments, system 340 may comprise a display 345. Display 345 may comprise any display device capable of displaying information received from processor circuit 302. Examples for display 345 may include a television, a monitor, a projector, and a computer screen. In one embodiment, for example, display 345 may be implemented by a liquid crystal display (LCD), light emitting diode (LED) or other type of suitable visual interface. Display 345 may comprise, for example, a touch-sensitive display screen ("touchscreen"). In various implementations, display 345 may comprise one or more thin-film transistors (TFT) LCD including embedded transistors. The embodiments, however, are not limited to these examples.

During general operation of apparatus 300 and/or system 340, a remote device 370 may be operative to initiate a DL transmission procedure in order to send data to apparatus 300 and/or system 340. In some embodiments, the remote device 370 may be the same as or similar to apparatus 200 and/or system 240 of FIG. 2. In various embodiments, during the DL transmission procedure, apparatus 300 and/or system 340 may be operative to receive a DL data transmission 308 from the remote device 370. In some embodiments, remote device 370 may comprise an STR-capable device, such as an STR-AP, that is able to receive a UL data transmission 314 from a remote device 360 while it sends DL data transmission 308 to apparatus 300 and/or system 340. In various embodiments, the remote device 360 may comprise a STA. In some embodiments, the remote device 360 may be the same as or similar to remote device 260 of FIG. 2. The embodiments are not limited in this context.

In various embodiments, the question of whether it is desirable for remote device 370 to use its STR capabilities to receive UL data transmission 314 from remote device 360 while it sends DL data transmission 308 to apparatus 300 and/or system 340 may depend on the level of collateral interference resulting at apparatus 300 and/or system 340 from transmission of UL data transmission 314 by remote device 360. In some embodiments, it may be desirable that UL data transmission 314 be performed concurrently with DL data transmission 308 if the estimated level of collateral interference resulting at apparatus 300 and/or system 340 from UL data transmission 314 is low enough that DL data transmission 308 can be expected to be properly received. In various embodiments, if the estimated level of collateral interference is such that DL data transmission 308 cannot be expected to be properly received, or is such that the expected odds of properly receiving DL data transmission 308 are below a threshold, it may not be desirable that UL data transmission 314 be performed concurrently with DL data transmission 308. The embodiments are not limited in this context.

In some embodiments, in order to enable remote devices such as remote device 360 to evaluate whether prospective UL data transmissions to remote device 370 will cause excessive estimated levels of collateral interference at apparatus 300 and/or system 340, communications component 306 may be operative to disseminate a collateral interference margin 312. Collateral interference margin 312 may generally comprise an indication of a level of collateral interference above which apparatus 300 and/or system 340 may not expect to properly receive DL data transmission 308, or above which the expected odds of properly receiving DL data transmission 308 are below an acceptability threshold. The embodiments are not limited in this context.

In various embodiments, communications component 306 may be operative to determine collateral interference margin 312 based on information obtained from measurement component 320. In some embodiments, for example, measurement component 320 may be operative to measure one or more channel characteristics 322 for a DL channel over which DL data transmission 308 is received, and communications component 306 may be operative to determine collateral interference margin 312 based on the one or more channel characteristics 322. In various embodiments, channel characteristics 322 may comprise a signal-to-noise ratio (SNR) for the DL channel and/or a noise level for the DL channel. In some embodiments, the effective SNR that communications component 306 may expect to require in order to properly receive DL data transmission 308 may depend on a modulation and coding scheme (MCS) for DL data transmission 308. As such, in various embodiments, communications component 306 may be operative to determine collateral interference margin 312 based on one or more channel characteristics 322 and on the MCS for DL data transmission 308. In some embodiments, communications component 306 may be operative to determine collateral interference margin 312 according to Equation (1):

$$Z=(SNR/SNR_{req}-1)*N \quad (1)$$

where Z represents the collateral interference margin 312, SNR represents a measured signal-to-noise ratio for the DL channel, $SNR_{req}$ represents a required signal-to-noise ratio for receiving DL data transmission 308 over the DL channel given the MCS for DL data transmission 308, and N represents a noise level for the DL channel. The embodiments are not limited in this context.

In various embodiments, in order to disseminate collateral interference margin 312 for use by remote devices in considering whether to perform UL transmission to remote device 370 during transmission of DL data transmission 308, communications component 306 may be operative to include collateral interference margin 312 in a UL message 324. In some embodiments, UL message 324 may comprise a message that communications component 306 sends to remote device 370 prior to remote device 370 initiating the DL transmission procedure according to which it sends DL data transmission 308 to apparatus 300 and/or system 340. For example, in various embodiments, communications component 306 may be operative to include collateral interference margin 312 in a data packet or a control packet, such as an acknowledgment message, that it sends to remote device 370 prior to initiation of the DL transmission procedure. In some other embodiments, UL message 324 may comprise a message that communications component 306 sends to remote device 370 during the DL transmission procedure. For example, in various embodiments, communications component 306 may be operative to include collateral interference margin 312 in a CTS that it sends to remote device 370 during the DL transmission procedure. The embodiments are not limited in this context.

In some embodiments, one or more remote devices such as remote device 360 may obtain collateral interference margin 312 from remote device 370. For example, in various embodiments in which communications component 306 includes collateral interference margin 312 in a data packet or control packet that it sends to remote device 370 prior to initiation of the DL transmission procedure, remote device 370 may then be operative to announce collateral interference margin 312 to one or more remote devices in an RTS or data packet header. In some embodiments, one or more remote devices such as remote device 360 may obtain collateral interference margin 312 directly from apparatus 300 and/or system 340, by overhearing UL message 324. For example, in various embodiments in which communications component 306 includes collateral interference margin 312 in a CTS that it sends to remote device 370 during the DL transmission procedure, one or more remote devices may obtain collateral interference margin 312 by overhearing that CTS. The embodiments are not limited in this context.

In some embodiments, one or more remote devices may consider whether to perform UL transmission to remote device 370 during transmission of DL data transmission 308, based on collateral interference margin 312. More particularly, in various embodiments, one or more remote devices may consider whether to perform such UL transmission by comparing collateral interference margin 312 to the respective levels of collateral interference that they expect to cause at apparatus 300 and/or system 340 if they perform UL transmission. In some embodiments, in order to enable remote devices to estimate the levels of collateral interference that they will cause, communications component 306 may be operative to include a UL transmit power value 326 in UL message 324. UL transmit power value 326 may comprise a value indicating a transmit power used by apparatus 300 and/or system 340 to transmit UL message 324.

In various embodiments, one or more remote devices may generate collateral interference estimates based on UL transmit power value 326 and on the signal strengths with which they receive UL message 324. In some embodiments, one or more remote devices may generate collateral interference estimates based on an assumption of channel reciprocity. In various embodiments, any particular remote device, such as remote device 360, may generate a collateral interference estimate according to Equation (2):

$$CI=S_R*P_TP_R \qquad (2)$$

where CI represents the estimated collateral interference, $S_R$ represents the signal strength with which UL message 324 is received, $P_T$ represents the transmit power to be used to perform UL transmission to remote device 370, and $P_R$ represents UL transmit power value 326. It is worthy of note that, although the example of FIG. 3 depicts collateral interference margin 312 and UL transmit power value 326 being comprised in a same UL message 324, the embodiments are not limited to this example. In some other embodiments, collateral interference margin 312 may be included in a different UL message than UL transmit power value 326. The embodiments are not limited in this context.

In various embodiments, communications component 306 may be operative to receive DL data transmission 308 from remote device 370 during the DL transmission procedure. In some embodiments, once it finishes receiving DL data transmission 308, communications component 306 may be operative to send an acknowledgment 316 to remote device 370 in order to acknowledge receipt of DL data transmission 308. The embodiments are not limited in this context.

Figure 4:
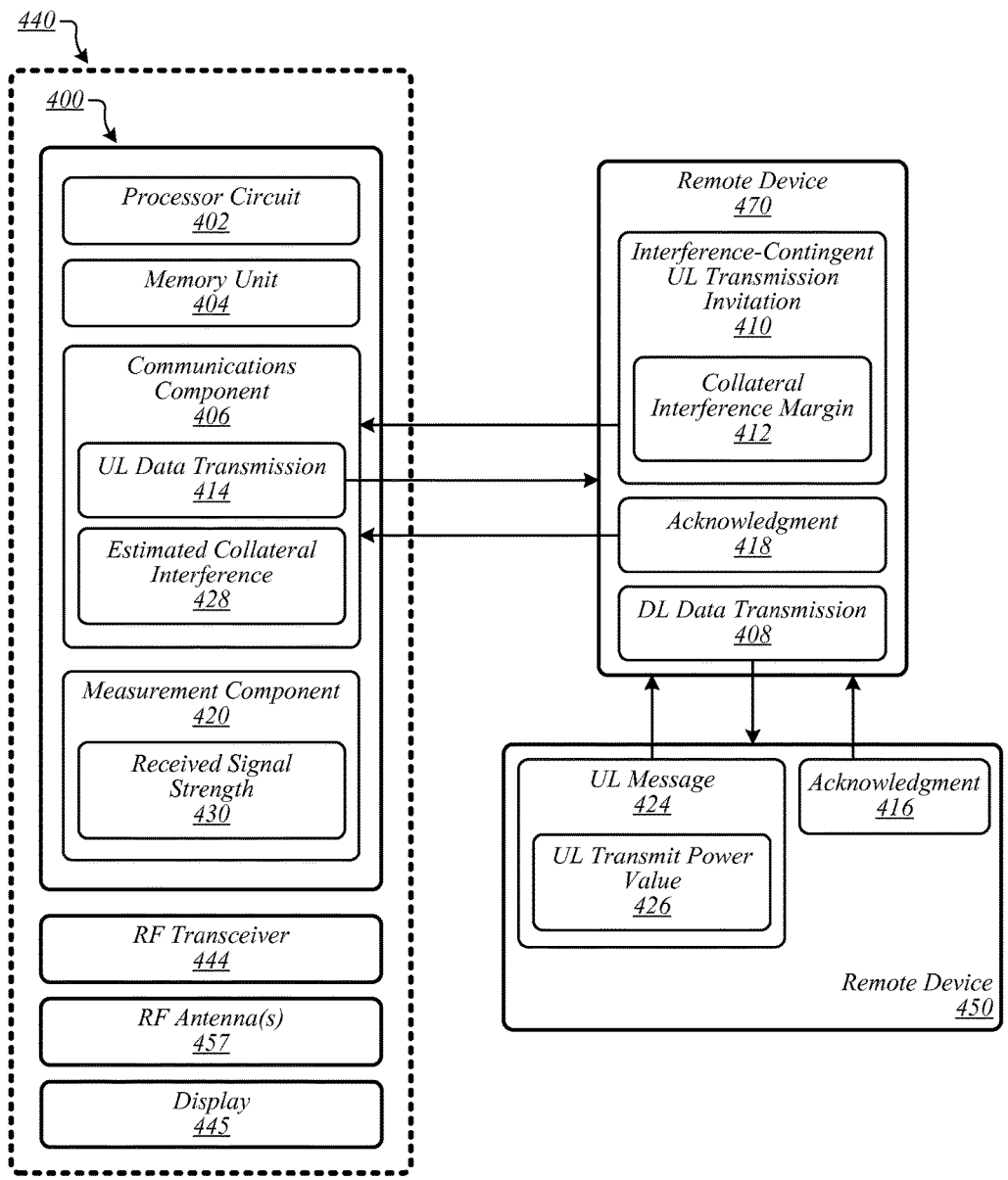
FIG. 4 illustrates an embodiment of a third apparatus and an embodiment of a third system.

FIG. 4 illustrates a block diagram of an apparatus 400 such as may be representative of various embodiments. More particularly, apparatus 400 may be representative of a STA that implements interference management techniques to support full-duplex wireless communications in some embodiments. For example, apparatus 400 may be representative of remote device 260 of FIG. 2 and/or remote device 360 of FIG. 3. As shown in FIG. 4, apparatus 400 comprises multiple elements including a processor circuit 402, a memory unit 404, a communications component 406, and a measurement component 420. The embodiments, however, are not limited to the type, number, or arrangement of elements shown in this figure.

In various embodiments, apparatus 400 may comprise processor circuit 402. Processor circuit 402 may be implemented using any processor or logic device, and may be the same as or similar to processor circuit 202 of FIG. 2 and/or processor circuit 203 of FIG. 3. The embodiments are not limited in this context.

In some embodiments, apparatus 400 may comprise or be arranged to communicatively couple with a memory unit 404. Memory unit 404 may be implemented using any machine-readable or computer-readable media capable of storing data, including both volatile and non-volatile memory, and may be the same as or similar to memory unit 204 of FIG. 2 and/or memory unit 304 of FIG. 3. The embodiments are not limited in this context.

In various embodiments, apparatus 400 may comprise a communications component 406. Communications component 406 may comprise logic, circuitry, and/or instructions operative to send messages to one or more remote devices and/or to receive messages from one or more remote devices, and may be the same as or similar to communications component 206 of FIG. 2 communications component 306 of FIG. 3. The embodiments are not limited in this context.

In some embodiments, apparatus 400 may comprise a measurement component 420. Measurement component 420 may comprise logic, circuitry, and/or instructions operative to measure one or more characteristics of one or more messages exchanged between communications component 406 and one or more remote devices, and may be the same as or similar to measurement component 320 of FIG. 3. The embodiments are not limited in this context.

FIG. 4 also illustrates a block diagram of a system 440. System 440 may comprise any of the aforementioned elements of apparatus 400. System 440 may further comprise a radio frequency (RF) transceiver 444. RF transceiver 444 may comprise one or more radios capable of transmitting and receiving signals using various suitable wireless communications techniques, and may be the same as or similar to RF transceiver 244 of FIG. 2 and/or RF transceiver 344 of FIG. 3. The embodiments are not limited in this context.

In various embodiments, system 440 may comprise one or more RF antennas 457. Examples of any particular RF antenna 457 may include, without limitation, any of the examples previously mentioned with respect to RF antenna(s) 257 of FIG. 2 and/or RF antenna(s) 357 of FIG. 3. In various embodiments, RF transceiver 444 may be operative to send and/or receive messages and/or data using one or more RF antennas 457. The embodiments are not limited in this context.

In some embodiments, system 440 may comprise a display 445. Display 445 may comprise any display device capable of displaying information received from processor circuit 402, and may be the same as or similar to display 345 of FIG. 3. The embodiments are not limited in this context.

During general operation of apparatus 400 and/or system 440, a remote device 470 may be operative to initiate a DL transmission procedure in order to send data to a remote device 450. In various embodiments, the remote device 470 may be the same as or similar to apparatus 200 and/or system 240 of FIG. 2 and/or remote device 370 of FIG. 3. In some embodiments, during the DL transmission procedure, the remote device 470 may be operative to send a DL data transmission 408 to the remote device 450. In various embodiments, the remote device 470 may comprise an STR-capable device, such as an STR-AP, that is able to receive a UL data transmission while it sends DL data transmission 408 to the remote device 450. In some embodiments, the remote device 450 may comprise a STA. In various embodiments, the remote device 450 may be the same as or similar to remote device 250 of FIG. 2 and/or apparatus 300 and/or system 340 of FIG. 3. The embodiments are not limited in this context.

In some embodiments, apparatus 400 and/or system 440 may be operative to receive a interference-contingent UL transmission invitation 410 from remote device 470. In various embodiments, the interference-contingent UL transmission invitation 410 may indicate that remote device 470 is an STR-capable device. In some embodiments, the interference-contingent UL transmission invitation 410 may identify remote device 450 as the destination device for DL data transmission 408. In various embodiments, interference-contingent UL transmission invitation 410 may specifically identify apparatus 400 and/or system 440 as the one device that is invited to send a UL data transmission to remote device 470 during transmission of DL data transmission 408. In some other embodiments, interference-contingent UL transmission invitation 410 may comprise a non-specific invitation for consideration by a plurality of remote devices. In various embodiments, interference-contingent UL transmission invitation 410 may be comprised within an RTS. In some other embodiments, interference-contingent UL transmission invitation 410 may be comprised within a data packet. The embodiments are not limited in this context.

In various embodiments, interference-contingent UL transmission invitation 410 may comprise a conditional invitation to perform UL transmission during transmission of DL data transmission 408. More particularly, with respect to apparatus 400 and/or system 440, the invitation embodied by interference-contingent UL transmission invitation 410 may be contingent upon a determination by apparatus 400 and/or system 440 that the collateral interference resulting at remote device 450 from UL transmission is expected to be small enough that it does not prevent remote device 450 from properly receiving DL data transmission 408. The embodiments are not limited in this context.

In some embodiments, interference-contingent UL transmission invitation 410 may comprise a collateral interference margin 412. Collateral interference margin 412 may generally comprise an indication of a level of collateral interference above which remote device 450 may not expect to properly receive DL data transmission 408, or above which the expected odds of remote device 450 properly receiving DL data transmission 408 are below an acceptability threshold. Although collateral interference margin 412 is comprised in interference-contingent UL transmission invitation 410 in the example of FIG. 4, the embodiments are not limited to this example. In various other embodiments, apparatus 400 and/or system 440 may be operative to receive collateral interference margin 412 from remote device 470 in a different message than interference-contingent UL transmission invitation 410. In yet other embodiments, apparatus 400 and/or system 440 may be operative to obtain collateral interference margin 412 directly from remote device 450, rather than receiving it from remote device 470. For example, in some embodiments, communications component 406 may be operative to obtain collateral interference margin 412 by overhearing a UL transmission of remote device 450 that contains collateral interference margin 412. The embodiments are not limited in this context.

In various embodiments, apparatus 400 and/or system 440 has data to send to remote device 470, communications component 406 may be operative to consider performing a UL data transmission 414 that is concurrent with DL data transmission 408. In some embodiments, in order to consider the prospective UL data transmission 414, communications component 406 may be operative to determine an estimated collateral interference 428. Estimated collateral interference 428 may comprise an estimate of a level of collateral interference that will result at remote device 450 if apparatus 400 and/or system 440 sends UL data transmission 414 to remote device 470 using a particular transmit power. In various embodiments, communications component 406 may be operative to determine estimated collateral interference 428 based generally on a UL message 424 sent by remote device 450 and overheard by apparatus 400 and/or system 440. The embodiments are not limited in this context.

In some embodiments, measurement component 420 may be operative to measure a received signal strength 430. Received signal strength 430 may comprise a value indicating a signal strength with which communications component 406 receives the UL message 424 sent by remote device 450. In various embodiments, UL message 424 may comprise a message that remote device 450 sends to remote device 470 prior to remote device 470 initiating the DL transmission procedure according to which it sends DL data transmission 408 to remote device 450. For example, in some embodiments, UL message 424 may comprise a data packet or a control packet, such as an acknowledgment message, that remote device 450 sends to remote device 470 prior to initiation of the DL transmission procedure. In various other embodiments, UL message 424 may comprise a message that remote device 450 sends to remote device 470 during the DL transmission procedure. For example, in some embodiments, UL message 424 may comprise a CTS that remote device 450 sends to remote device 470 during the DL transmission procedure. In various embodiments, UL message 424 may contain collateral interference margin 412, and communications component 406 may be operative to determine collateral interference margin 412 by overhearing UL message 424. The embodiments are not limited in this context.

In some embodiments, UL message 424 may comprise a UL transmit power value 426. UL transmit power value 426 may comprise a value indicating a transmit power used by remote device 450 to transmit UL message 424. In various embodiments, for a prospective transmit power $P_T$ for sending UL data transmission 414, communications component 406 may be operative to determine a corresponding estimated collateral interference 428 based on the received signal strength 430 for UL message 424 and on the UL transmit power value 426 for UL message 424. In some embodiments, communications component 406 may be operative to determine a corresponding estimated collateral interference 428 for the prospective transmit power $P_T$ according to Equation (2) above. The embodiments are not limited in this context.

In various embodiments, communications component 406 may be operative to determine whether to perform the prospective UL data transmission 414 by comparing the estimated collateral interference 428 to collateral interference margin 412. In some embodiments, if the estimated collateral interference 428 is less than the collateral interference margin 412, communications component 406 may be operative to determine that it may perform the prospective UL data transmission 414 using the transmit power $P_T$ to which the estimated collateral interference 428 corresponds. In various embodiments, if the estimated collateral interference 428 is greater than the collateral interference margin 412, communications component 406 may be operative to determine that it may not perform the prospective UL data transmission 414 using that transmit power $P_T$. In some embodiments, communications component 406 may be operative to consider one or more reduced transmit powers for prospective UL data 414 if the estimated collateral interference 428 corresponding to transmit power $P_T$ is greater than collateral interference margin 412. For example, in various embodiments, communications component 406 may be operative to identify a transmit power $P_T'$ that is smaller than $P_T$, determine a corresponding estimated collateral interference 428 for the reduced transmit power $P_T'$, and determine that it may perform the prospective UL data transmission 414 using the reduced transmit power $P_T'$ if the corresponding estimated collateral interference 428 is less than collateral interference margin 412. The embodiments are not limited in this context.

In some embodiments, communications component 406 may be operative to identify a transmit power $P_T^{min}$ that comprises an approximate lowest transmit power via which UL data transmission 414 may still be expected to be properly received by remote device 470. In various embodiments, communications component 406 may be operative to identify transmit power $P_T^{min}$ based on measurements of a channel between apparatus 400 and/or system 440 and remote device 470. In some embodiments, communications component 406 may be operative to obtain one or more such measurements from measurement component 420. In various embodiments, communications component 406 may be operative to determine a corresponding estimated collateral interference 428 for transmit power $P_T^{min}$. In some embodiments, communications component 406 may be operative to determine that it may perform the prospective UL data transmission 414 using at least the transmit power $P_T^{min}$ if the corresponding estimated collateral interference 428 for transmit power $P_T^{min}$ is less than collateral interference margin 412. In various embodiments, if communications component 406 determines that it may not perform the prospective UL data transmission 414 using transmit power $P_T$ but that it may perform the UL data transmission 414 using a reduced transmit power $P_T'$ or $P_T^{min}$, communications component 406 may be operative to select an alternate MCS for use in performing the UL data transmission 414. In some embodiments, for example, communications component 406 may be operative to select an alternate MCS that provides a lower data rate but requires a lesser SNR. The embodiments are not limited in this context.

In various embodiments, interference-contingent UL transmission invitation 410 may comprise an invitation that is specific to apparatus 400 and/or system 440, and communications component 406 may be operative to proceed with UL data transmission 414 once it has determined that it may perform UL data transmission 414. In some other embodiments, interference-contingent UL transmission invitation 410 may comprise a non-specific invitation, and communications component 406 may be operative to contend for the opportunity to send UL data transmission 414 once it has determined that it may perform UL data transmission 414. In various embodiments, for example, communications component 406 may be operative to perform a random backoff and then determine whether to perform UL data transmission 414 based on an availability of a channel for sending UL data transmission 414. If the channel is available, communications component 406 may be operative to perform UL data transmission 414. If the channel is not available, communications component 406 may not be operative to perform UL data transmission 414. The embodiments are not limited in this context.

In some embodiments, communications component 406 may be operative to send UL data transmission 414 to remote device 470 while remote device 470 sends DL data transmission 408 to remote device 450. In various embodiments, once remote device 450 finishes receiving DL data transmission 408, it may send an acknowledgment 416 to remote device 470. Similarly, once remote device 470 finishes receiving UL data transmission 414, it may send an acknowledgment 418 to apparatus 400 and/or system 440. In some embodiments, remote device 470 may not be capable of sending multiple transmissions simultaneously, and it may therefore be desirable to prevent temporal overlap between DL data transmission 408 and acknowledgment 418. Similarly, in various embodiments, remote device 470 may not be capable of receiving multiple transmissions simultaneously, and it may therefore be desirable to prevent temporal overlap between UL data transmission 414 and acknowledgment 416.

In some embodiments, in order to prevent temporal overlap between these respective messages, it may be desirable that DL data transmission 408 be completed at a same or approximately same time as UL data transmission 414. In various embodiments, communications component 406 may be operative to adjust a duration of UL data transmission 414 in order to cause it to be completed at a same or approximately same time as DL data transmission 408. In some embodiments, if it determines that UL data transmission 414 will complete before DL data transmission 408, communications component 406 may be operative to extend UL data transmission 414 by, for example, padding it with empty bits. In various embodiments, if it determines that DL data transmission 408 will complete before UL data transmission 414, communications component 406 may be operative to divide UL data transmission 414 into multiple portions, and may send only one or some of those portions during transmission of DL data transmission 408. In some embodiments, communications component 406 may be operative to determine a time or approximate time at which DL data transmission 408 will complete by overhearing messages sent by remote device 470 and/or remote device 450. For example, in various embodiments, communications component 406 may be operative to determine a time or approximate time at which DL data transmission 408 will complete by overhearing an RTS sent by remote device 470. The embodiments are not limited to this example.

It is worthy of note that in some embodiments, the same interference considerations that apply to concurrent transmission of DL data transmission 408 and UL data transmission 414 may be applicable to concurrent transmission of acknowledgment 416 and acknowledgment 418. Namely, in various embodiments, when remote device 450 sends acknowledgment 416 to remote device 470, it may cause collateral interference at apparatus 400 and/or system 440 with the acknowledgment 418 that remote device 470 sends to apparatus 400 and/or system 440. In some embodiments, communications component 406 may be operative to estimate the collateral interference caused by acknowledgment 416 based on the received signal strength 430 for UL message 424. In various embodiments, communications component 406 may be operative to estimate the signal strength with which it will receive acknowledgment 418 by overhearing DL data transmission 408. In some embodiments, communications component 406 may be operative to suggest an MCS for use by remote device 470 in sending acknowledgment 418 such that apparatus 400 and/or system 440 will still be able to properly receive acknowledgment 418 despite the collateral interference caused by acknowledgment 416. In various embodiments, communications component 406 may be operative to include the suggested MCS in UL data transmission 414. In some embodiments, if communications component 406 determines that there is no MCS via which apparatus 400 and/or system 440 might subsequently receive acknowledgment 418 from remote device 470, communications component 406 may be operative to determine that it may not perform UL data transmission 414. In various embodiments, rather than determining an MCS for acknowledgment 418 based on a suggestion from apparatus 400 and/or system 440, remote device 470 may be operative to use a most interference-tolerant MCS by default. The embodiments are not limited in this context.

It will be appreciated that using STR capabilities of a device such as an STR-AP to perform full-duplex communications may significantly increase wireless network area throughput during periods when those full-duplex communications are performed. It is worthy of note, however, that in some embodiments, a STR-AP or other STR-capable device may first need to contend with other network devices and receive a transmission opportunity before it can make use of its STR capabilities. For example, in order to receive transmission opportunities, an STR-AP in a basic service set (BSS) of a Wi-Fi network may be required to contend with a number of STAs in that BSS. If the number of STAs in the BSS is large and the STR-AP contends with those STAs on an equal footing, the STR-AP may receive transmission opportunities relatively infrequently, and thus the area throughput gains resulting from full-duplex communications may be relatively small. In various embodiments, in order to increase such area throughput benefits, it may be desirable to provide an STR-AP or other STR-capable device with some level of increased priority with respect to its contention with other network devices. For example, in some embodiments, an STR-AP or other STR-capable device may be configured with a reduced backoff window size, or may be configured to announce an increased backoff window size for other devices in its wireless network. In various such embodiments, the STR-AP or other STR-capable device may be more likely to emerge from any particular contention as a transmission opportunity holder, and thus may be more frequently able to utilize full-duplex communications to increase area throughput. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
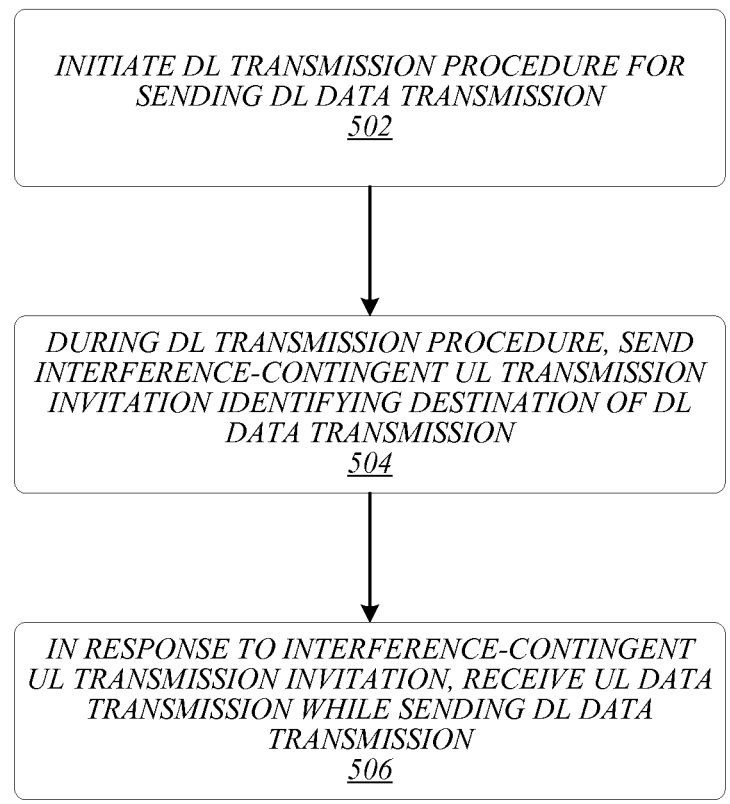
FIG. 5 illustrates an embodiment of a first logic flow.

FIG. 5 illustrates one embodiment of a logic flow 500, which may be representative of the operations executed by one or more embodiments described herein. More particularly, logic flow 500 may be representative of operations that may be performed by apparatus 200 and/or system 240 of FIG. 2 in various embodiments. As shown in logic flow 500, a DL transmission procedure for sending a DL data transmission may be initiated at 502. For example, communications component 206 of FIG. 2 may be operative to initiate a DL transmission procedure for sending DL data transmission 208 to remote device 250. At 504, during the DL transmission procedure, an interference-contingent UL transmission invitation may be sent that identifies a destination of the DL data transmission. For example, communications component 206 of FIG. 2 may be operative to send a interference-contingent UL transmission invitation 210 that identifies remote device 250 as the destination of DL data transmission 208. At 506, in response to the interference-contingent UL transmission invitation, a UL data transmission may be received while the DL data transmission is being sent. For example, in response to the interference-contingent UL transmission invitation 210 of FIG. 2, communications component 206 may be operative to receive UL data transmission 214 from remote device 260 while sending DL data transmission 208 to remote device 250. The embodiments are not limited to these examples.

Figure 6:
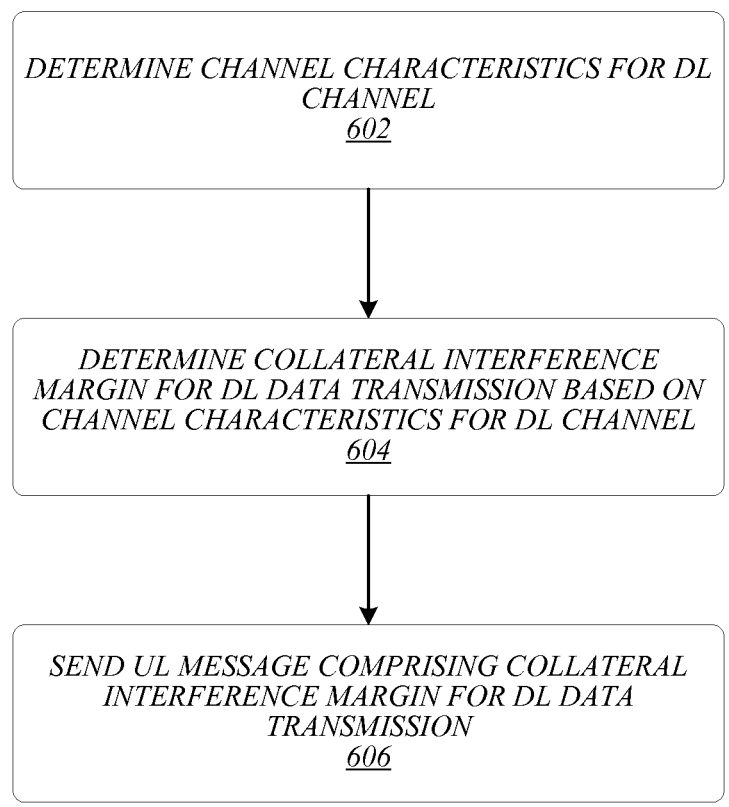
FIG. 6 illustrates an embodiment of a second logic flow.

FIG. 6 illustrates one embodiment of a logic flow 600, which may be representative of the operations executed by one or more embodiments described herein. More particularly, logic flow 600 may be representative of operations that may be performed by apparatus 300 and/or system 340 of FIG. 3 in some embodiments. As shown in logic flow 600, channel characteristics for a DL channel may be determined at 602. For example, measurement component 320 of FIG. 3 may be operative to determine channel characteristics 322 for a DL channel from remote device 370 to apparatus 300 and/or system 340. At 604, a collateral interference margin for a DL data transmission may be determined based on the channel characteristics for the DL channel. For example, communications component 306 of FIG. 3 may be operative to determine collateral interference margin 312 for DL data transmission 308 based on the channel characteristics 322 for the DL channel over which remote device 370 sends DL data transmission 308 to apparatus 300 and/or system 340. At 606, a UL message may be sent that comprises the collateral interference margin for the DL data transmission. For example, communications component 306 of FIG. 3 may be operative to send a UL message 324 comprising the collateral interference margin 312 for DL data transmission 308. The embodiments are not limited to these examples.

Figure 7:
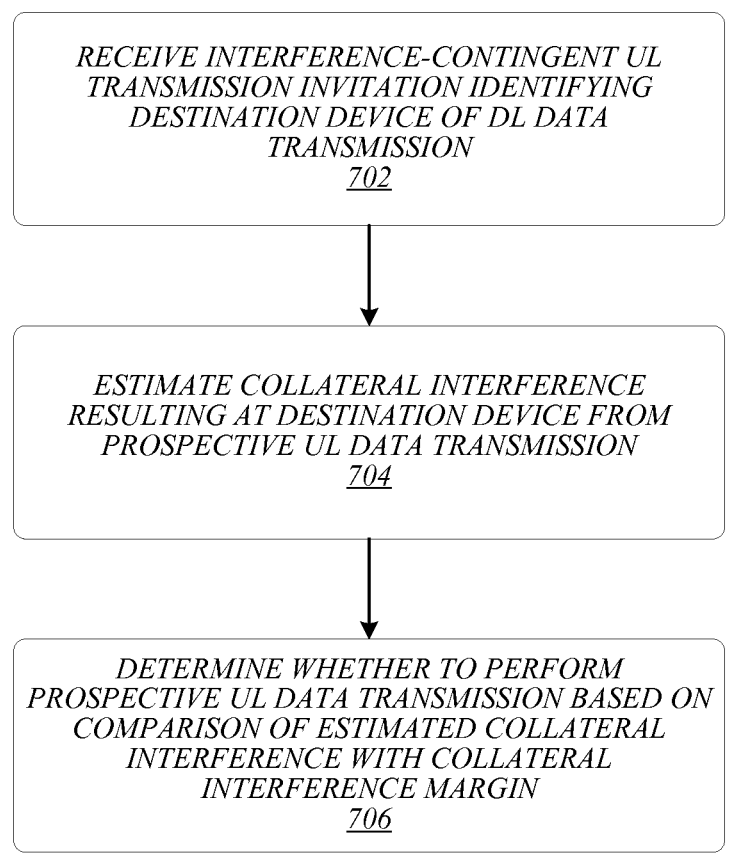
FIG. 7 illustrates an embodiment of a third logic flow.

FIG. 7 illustrates one embodiment of a logic flow 700, which may be representative of the operations executed by one or more embodiments described herein. More particularly, logic flow 700 may be representative of operations that may be performed by apparatus 400 and/or system 440 of FIG. 4 in various embodiments. As shown in logic flow 700, an interference-contingent UL transmission invitation may be received at 702 that identifies a destination device of a DL data transmission. For example, communications component 406 of FIG. 4 may be operative to receive an interference-contingent UL transmission invitation 410 from remote device 470 that identifies remote device 450 as the destination of DL data transmission 408. At 704, a collateral interference resulting at the destination device from a prospective UL data transmission may be estimated. For example, communications component 406 of FIG. 4 may be operative to determine an estimated collateral interference 428 that will result at remote device 450 from prospective transmission of UL data transmission 414. At 706, it may be determined whether to perform the prospective UL data transmission based on a comparison of the estimated collateral interference with a collateral interference margin. For example, communications component 406 of FIG. 4 may be operative to determine whether it may perform UL data transmission 414 by comparing estimated collateral interference 428 with collateral interference margin 412. The embodiments are not limited to these examples.

Figure 8:
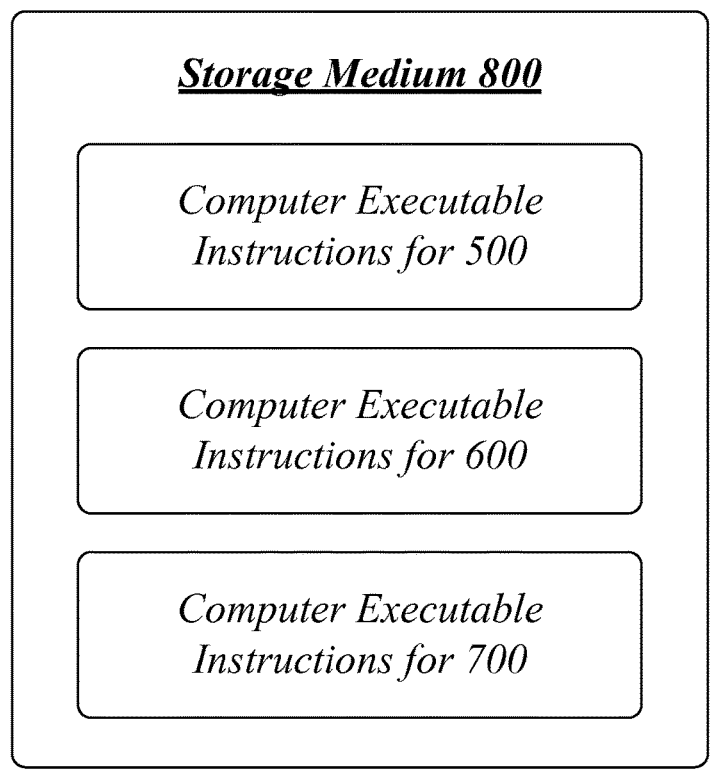
FIG. 8 illustrates an embodiment of a storage medium.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement one or more of logic flow 500 of FIG. 5, logic flow 600 of FIG. 6, and/or logic flow 700 of FIG. 7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
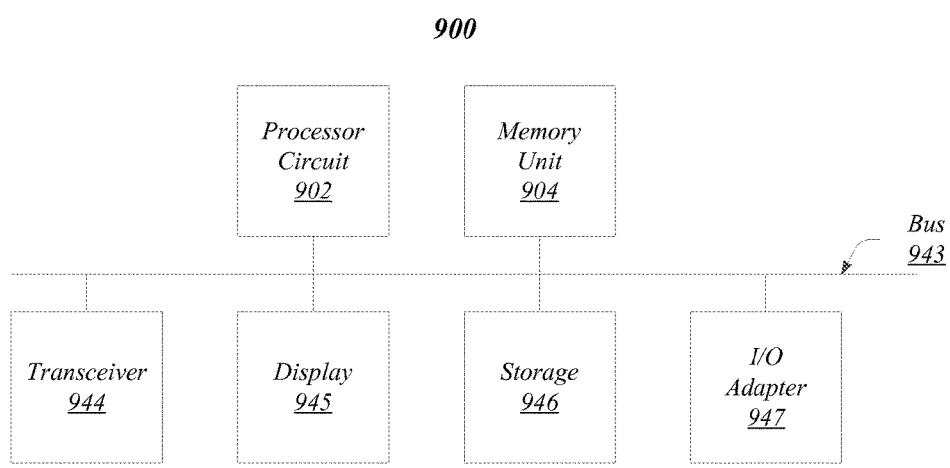
FIG. 9 illustrates an embodiment of a fourth system.

FIG. 9 illustrates one embodiment of a system 900. In various embodiments, system 900 may be representative of a system or architecture suitable for use with one or more embodiments described herein, such as apparatus 200 and/or system 240 of FIG. 2, apparatus 300 and/or system 340 of FIG. 3, apparatus 400 and/or system 440 of FIG. 4, logic flow 500 of FIG. 5, logic flow 600 of FIG. 6, logic flow 700 of FIG. 7, and/or storage medium 800 of FIG. 8. The embodiments are not limited in this respect.

As shown in FIG. 9, system 900 may include multiple elements. One or more elements may be implemented using one or more circuits, components, registers, processors, software subroutines, modules, or any combination thereof, as desired for a given set of design or performance constraints. Although FIG. 9 shows a limited number of elements in a certain topology by way of example, it can be appreciated that more or less elements in any suitable topology may be used in system 900 as desired for a given implementation. The embodiments are not limited in this context.

In various embodiments, system 900 may include a processor circuit 902. Processor circuit 902 may be implemented using any processor or logic device, and may be the same as or similar to processor circuit 202 of FIG. 2, processor circuit 302 of FIG. 3, and/or processor circuit 402 of FIG. 4.

In one embodiment, system 900 may include a memory unit 904 to couple to processor circuit 902. Memory unit 904 may be coupled to processor circuit 902 via communications bus 943, or by a dedicated communications bus between processor circuit 902 and memory unit 904, as desired for a given implementation. Memory unit 904 may be implemented using any machine-readable or computer-readable media capable of storing data, including both volatile and non-volatile memory, and may be the same as or similar to memory unit 204 of FIG. 2, memory unit 304 of FIG. 3, and/or memory unit 404 of FIG. 4. In some embodiments, the machine-readable or computer-readable medium may include a non-transitory medium. The embodiments are not limited in this context.

In various embodiments, system 900 may include an RF transceiver 944. RF transceiver 944 may include one or more radios capable of transmitting and receiving signals using various suitable wireless communications techniques, and may be the same as or similar to RF transceiver 244 of FIG. 2, RF transceiver 344 of FIG. 3, and/or RF transceiver 444 of FIG. 4. The embodiments are not limited in this context.

In various embodiments, system 900 may include a display 945. Display 945 may comprise any display device capable of displaying information received from processor circuit 902, and may be the same as or similar to display 345 of FIG. 3 and/or display 445 of FIG. 4. The embodiments are not limited in this context.

In various embodiments, system 900 may include storage 946. Storage 946 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 946 may include technology to increase the storage performance enhanced protection for valuable digital media when multiple hard drives are included, for example. Further examples of storage 946 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 900 may include one or more I/O adapters 947. Examples of I/O adapters 947 may include Universal Serial Bus (USB) ports/adapters, IEEE 1394 Firewire ports/adapters, and so forth. The embodiments are not limited in this context.

Figure 10:
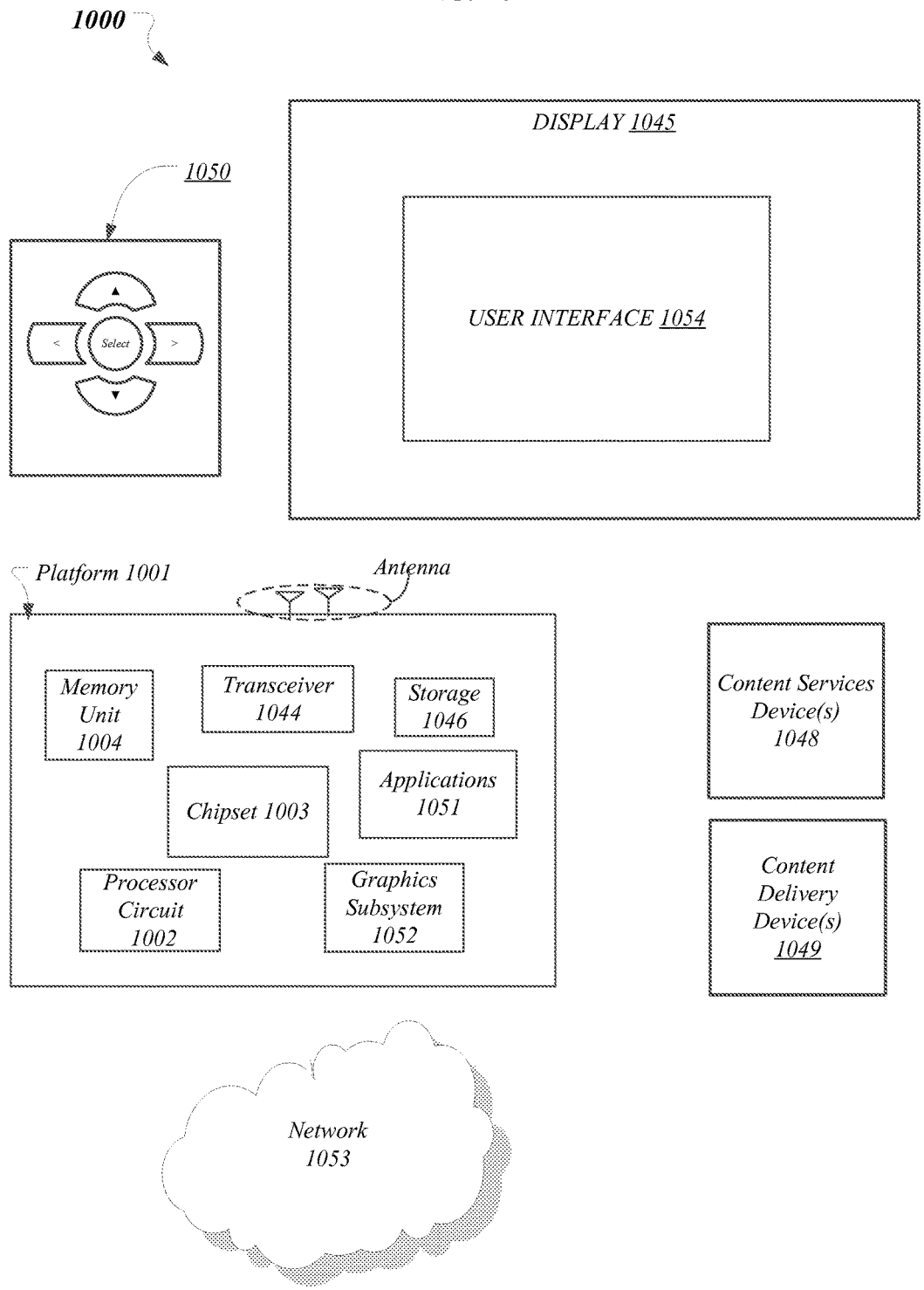
FIG. 10 illustrates an embodiment of a fifth system.

FIG. 10 illustrates an embodiment of a system 1000. In various embodiments, system 1000 may be representative of a system or architecture suitable for use with one or more embodiments described herein, such as apparatus 200 and/or system 240 of FIG. 2, apparatus 300 and/or system 340 of FIG. 3, apparatus 400 and/or system 440 of FIG. 4, logic flow 500 of FIG. 5, logic flow 600 of FIG. 6, logic flow 700 of FIG. 7, storage medium 800 of FIG. 8, and/or system 900 of FIG. 9. The embodiments are not limited in this respect.

As shown in FIG. 10, system 1000 may include multiple elements. One or more elements may be implemented using one or more circuits, components, registers, processors, software subroutines, modules, or any combination thereof, as desired for a given set of design or performance constraints. Although FIG. 10 shows a limited number of elements in a certain topology by way of example, it can be appreciated that more or less elements in any suitable topology may be used in system 1000 as desired for a given implementation. The embodiments are not limited in this context.

In embodiments, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1000 includes a platform 1001 coupled to a display 1045. Platform 1001 may receive content from a content device such as content services device(s) 1048 or content delivery device(s) 1049 or other similar content sources. A navigation controller 1050 including one or more navigation features may be used to interact with, for example, platform 1001 and/or display 1045. Each of these components is described in more detail below.

In embodiments, platform 1001 may include any combination of a processor circuit 1002, chipset 1003, memory unit 1004, transceiver 1044, storage 1046, applications 1051, and/or graphics subsystem 1052. Chipset 1003 may provide intercommunication among processor circuit 1002, memory unit 1004, transceiver 1044, storage 1046, applications 1051, and/or graphics subsystem 1052. For example, chipset 1003 may include a storage adapter (not depicted) capable of providing intercommunication with storage 1046.

Processor circuit 1002 may be implemented using any processor or logic device, and may be the same as or similar to processor circuit 902 in FIG. 9.

Memory unit 1004 may be implemented using any machine-readable or computer-readable media capable of storing data, and may be the same as or similar to memory unit 904 in FIG. 9.

Transceiver 1044 may include one or more radios capable of transmitting and receiving signals using various suitable wireless communications techniques, and may be the same as or similar to transceiver 944 in FIG. 9.

Display 1045 may include any television type monitor or display, and may be the same as or similar to display 945 in FIG. 9.

Storage 1046 may be implemented as a non-volatile storage device, and may be the same as or similar to storage 946 in FIG. 9.

Graphics subsystem 1052 may perform processing of images such as still or video for display. Graphics subsystem 1052 may be a graphics processing unit (GPU) or a visual processing unit (VPU), for example. An analog or digital interface may be used to communicatively couple graphics subsystem 1052 and display 1045. For example, the interface may be any of a High-Definition Multimedia Interface, DisplayPort, wireless HDMI, and/or wireless HD compliant techniques. Graphics subsystem 1052 could be integrated into processor circuit 1002 or chipset 1003. Graphics subsystem 1052 could be a stand-alone card communicatively coupled to chipset 1003.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 1048 may be hosted by any national, international and/or independent service and thus accessible to platform 1001 via the Internet, for example. Content services device(s) 1048 may be coupled to platform 1001 and/or to display 1045. Platform 1001 and/or content services device(s) 1048 may be coupled to a network 1053 to communicate (e.g., send and/or receive) media information to and from network 1053. Content delivery device(s) 1049 also may be coupled to platform 1001 and/or to display 1045.

In embodiments, content services device(s) 1048 may include a cable television box, personal computer, network, telephone, Internet enabled devices or appliance capable of delivering digital information and/or content, and any other similar device capable of unidirectionally or bidirectionally communicating content between content providers and platform 1001 and/display 1045, via network 1053 or directly. It will be appreciated that the content may be communicated unidirectionally and/or bidirectionally to and from any one of the components in system 1000 and a content provider via network 1053. Examples of content may include any media information including, for example, video, music, medical and gaming information, and so forth.

Content services device(s) 1048 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 1001 may receive control signals from navigation controller 1050 having one or more navigation features. The navigation features of navigation controller 1050 may be used to interact with a user interface 1054, for example. In embodiments, navigation controller 1050 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be echoed on a display (e.g., display 1045) by movements of a pointer, cursor, focus ring, or other visual indicators displayed on the display. For example, under the control of software applications 1051, the navigation features located on navigation controller 1050 may be mapped to virtual navigation features displayed on user interface 1054. In embodiments, navigation controller 1050 may not be a separate component but integrated into platform 1001 and/or display 1045. Embodiments, however, are not limited to the elements or in the context shown or described herein.

In embodiments, drivers (not shown) may include technology to enable users to instantly turn on and off platform 1001 like a television with the touch of a button after initial boot-up, when enabled, for example. Program logic may allow platform 1001 to stream content to media adaptors or other content services device(s) 1048 or content delivery device(s) 1049 when the platform is turned "off." In addition, chip set 1003 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 1000 may be integrated. For example, platform 1001 and content services device(s) 1048 may be integrated, or platform 1001 and content delivery device(s) 1049 may be integrated, or platform 1001, content services device(s) 1048, and content delivery device(s) 1049 may be integrated, for example. In various embodiments, platform 1001 and display 1045 may be an integrated unit. Display 1045 and content service device(s) 1048 may be integrated, or display 1045 and content delivery device(s) 1049 may be integrated, for example. These examples are not meant to limit the disclosed subject matter.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1001 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
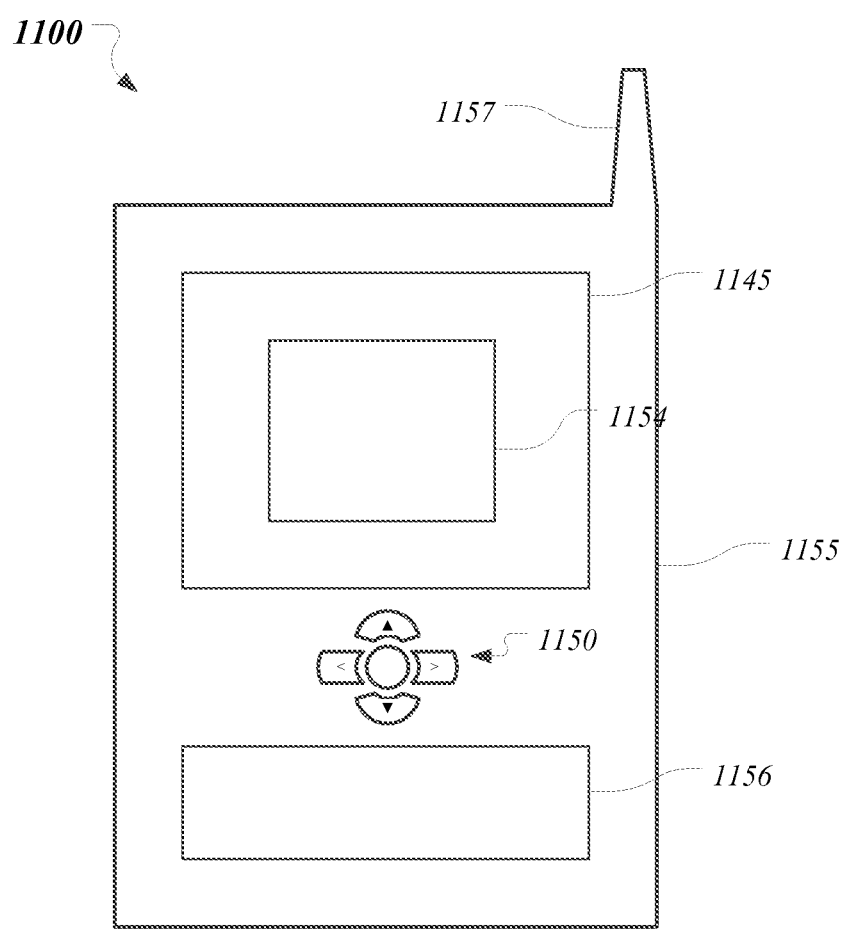
FIG. 11 illustrates an embodiment of a device.

As described above, system 1000 may be embodied in varying physical styles or form factors. FIG. 11 illustrates embodiments of a small form factor device 1100 in which system 1000 may be embodied. In embodiments, for example, device 1100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a display 1145, a navigation controller 1150, a user interface 1154, a housing 1155, an I/O device 1156, and an antenna 1157. Display 1145 may include any suitable display unit for displaying information appropriate for a mobile computing device, and may be the same as or similar to display 1045 in FIG. 10. Navigation controller 1150 may include one or more navigation features which may be used to interact with user interface 1154, and may be the same as or similar to navigation controller 1050 in FIG. 10. I/O device 1156 may include any suitable I/O device for entering information into a mobile computing device. Examples for I/O device 1156 may include an alphanumeric keyboard, a numeric keypad, a touch pad, input keys, buttons, switches, rocker switches, microphones, speakers, voice recognition device and software, and so forth. Information also may be entered into device 1100 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a wireless communication apparatus, comprising logic, at least a portion of which is in hardware, the logic to initiate a downlink (DL) transmission procedure for sending a DL data transmission, and during the DL transmission procedure, send an interference-contingent uplink (UL) transmission invitation identifying a destination of the DL data transmission and begin receiving a UL data transmission in response to the interference-contingent UL transmission invitation.

In Example 2, the interference-contingent UL transmission invitation of Example 1 may optionally identify a collateral interference margin for the DL data transmission.

In Example 3, the interference-contingent UL transmission invitation of any of Examples 1 to 2 may optionally comprise a request-to-send (RTS).

In Example 4, the interference-contingent UL transmission invitation of any of Examples 1 to 3 may optionally comprise an invitation for a specific remote device to perform UL transmission to the wireless communication apparatus.

In Example 5, the interference-contingent UL transmission invitation of any of Examples 1 to 3 may optionally comprise a non-specific invitation for consideration by any of a plurality of remote devices.

In Example 6, the logic of any of Examples 1 to 5 may optionally concurrently send an acknowledgment of the UL data transmission and receive an acknowledgment of the DL data transmission.

In Example 7, the logic of any of Examples 1 to 6 may optionally receive a UL message comprising a collateral interference margin for the DL data transmission.

In Example 8, the logic of any of Examples 1 to 7 may optionally receive the UL data transmission over a wireless channel of a wireless local area network (WLAN).

Example 9 is a system, comprising a wireless communication apparatus according to any of Examples 1 to 8, a radio frequency (RF) transceiver, and one or more RF antennas.

Example 10 is at least one non-transitory computer-readable storage medium comprising a set of wireless communication wireless communication instructions that, in response to being executed on a computing device, cause the computing device to initiate a downlink (DL) transmission procedure for sending a DL data transmission, and during the DL transmission procedure send an interference-contingent uplink (UL) transmission invitation identifying a destination of the DL data transmission, and begin receiving a UL data transmission in response to the interference-contingent UL transmission invitation.

In Example 11, the interference-contingent UL transmission invitation of Example 10 may optionally identify a collateral interference margin for the DL data transmission.

In Example 12, the interference-contingent UL transmission invitation of any of Examples 10 to 11 may optionally comprise a request-to-send (RTS).

In Example 13, the interference-contingent UL transmission invitation of any of Examples 10 to 12 may optionally comprise an invitation for a specific remote device to perform UL transmission to the computing device.

In Example 14, the interference-contingent UL transmission invitation of any of Examples 10 to 12 may optionally comprise a non-specific invitation for consideration by any of a plurality of remote devices.

In Example 15, the at least one non-transitory computer-readable storage medium of any of Examples 10 to 14 may optionally comprise wireless communication instructions that, in response to being executed on the computing device, cause the computing device to concurrently send an acknowledgment of the UL data transmission and receive an acknowledgment of the DL data transmission.

In Example 16, the at least one non-transitory computer-readable storage medium of any of Examples 10 to 15 may optionally comprise wireless communication instructions that, in response to being executed on the computing device, cause the computing device to receive a UL message comprising a collateral interference margin for the DL data transmission.

In Example 17, the at least one non-transitory computer-readable storage medium of any of Examples 10 to 16 may optionally comprise wireless communication instructions that, in response to being executed on the computing device, cause the computing device to receive the UL data transmission over a wireless channel of a wireless local area network (WLAN).

Example 18 is a wireless communication method, comprising initiating, by a processor circuit at an access point (AP), a downlink (DL) transmission procedure for sending a DL data transmission, and during the DL transmission procedure sending an interference-contingent uplink (UL) transmission invitation identifying a destination of the DL data transmission, and beginning receipt of a UL data transmission in response to the interference-contingent UL transmission invitation.

In Example 19, the interference-contingent UL transmission invitation of Example 18 may optionally identify a collateral interference margin for the DL data transmission.

In Example 20, the interference-contingent UL transmission invitation of any of Examples 18 to 19 may optionally comprise a request-to-send (RTS).

In Example 21, the interference-contingent UL transmission invitation of any of Examples 18 to 20 may optionally comprise an invitation for a specific remote device to perform UL transmission to the AP.

In Example 22, the interference-contingent UL transmission invitation of any of Examples 18 to 20 may optionally comprise a non-specific invitation for consideration by any of a plurality of remote devices.

In Example 23, the wireless communication method of any of Examples 18 to 22 may optionally comprise concurrently sending an acknowledgment of the UL data transmission and receiving an acknowledgment of the DL data transmission.

In Example 24, the wireless communication method of any of Examples 18 to 23 may optionally comprise receiving a UL message comprising a collateral interference margin for the DL data transmission.

In Example 25, the wireless communication method of any of Examples 18 to 24 may optionally comprise receiving the UL data transmission over a wireless channel of a wireless local area network (WLAN).

Example 26 is at least one machine-readable medium comprising a set of instructions that, in response to being executed on a computing device, cause the computing device to perform a wireless communication method according to any of Examples 18 to 25.

Example 27 is an apparatus, comprising means for performing a wireless communication method according to any of Examples 18 to 25.

Example 28 is a system, comprising an apparatus according to Example 27, a radio frequency (RF) transceiver, and one or more RF antennas.

Example 29 is a wireless communication apparatus, comprising means for initiating a downlink (DL) transmission procedure for sending a DL data transmission, and means for, during the DL transmission procedure sending an interference-contingent uplink (UL) transmission invitation identifying a destination of the DL data transmission, and beginning receipt of a UL data transmission in response to the interference-contingent UL transmission invitation.

In Example 30, the interference-contingent UL transmission invitation of Example 29 may optionally identify a collateral interference margin for the DL data transmission.

In Example 31, the interference-contingent UL transmission invitation of any of Examples 29 to 30 may optionally comprise a request-to-send (RTS).

In Example 32, the interference-contingent UL transmission invitation of any of Examples 29 to 31 may optionally comprise an invitation for a specific remote device to perform UL transmission to the wireless communication apparatus.

In Example 33, the interference-contingent UL transmission invitation of any of Examples 29 to 31 may optionally comprise a non-specific invitation for consideration by any of a plurality of remote devices.

In Example 34, the wireless communication apparatus of any of Examples 29 to 33 may optionally comprise means for concurrently sending an acknowledgment of the UL data transmission and receiving an acknowledgment of the DL data transmission.

In Example 35, the wireless communication apparatus of any of Examples 29 to 34 may optionally comprise means for receiving a UL message comprising a collateral interference margin for the DL data transmission.

In Example 36, the wireless communication apparatus of any of Examples 29 to 35 may optionally comprise means for receiving the UL data transmission over a wireless channel of a wireless local area network (WLAN).

Example 37 is a system, comprising a wireless communication apparatus according to any of Examples 29 to 36, a radio frequency (RF) transceiver, and one or more RF antennas.

Example 38 is a wireless communication apparatus, comprising logic, at least a portion of which is in hardware, the logic to receive an interference-contingent uplink (UL) transmission invitation identifying a destination device of a downlink (DL) data transmission, estimate a collateral interference resulting at the destination device from a prospective UL data transmission, and determine whether to perform the prospective UL data transmission based on a comparison of the estimated collateral interference with a collateral interference margin for the DL data transmission.

In Example 39, the interference-contingent UL transmission invitation of Example 38 may optionally comprise the collateral interference margin for the DL data transmission.

In Example 40, the logic of any of Examples 38 to 39 may optionally overhear a UL message originating from the destination device, the UL message indicating a UL transmit power for the UL message, determine a received signal strength for the UL message, and estimate the collateral interference based on the UL transmit power and the received signal strength.

In Example 41, the logic of any of Examples 38 to 40 may optionally determine a minimum transmit power for the prospective UL data transmission and estimate the collateral interference based on the minimum transmit power.

In Example 42, the logic of any of Examples 38 to 41 may optionally perform a random backoff and determine whether to perform the prospective UL data transmission based on an availability of a wireless channel following the random backoff.

In Example 43, the logic of any of Examples 38 to 42 may optionally adjust a duration of the prospective UL data transmission.

In Example 44, the logic of any of Examples 38 to 43 may optionally overhear a UL message originating from the destination device, the UL message comprising the collateral interference margin.

In Example 45, the logic of any of Examples 38 to 44 may optionally determine a reduced transmit power for the DL data transmission based on the collateral interference margin and select an alternate modulation and coding scheme (MCS) for the DL data transmission based on the reduced transmit power.

Example 46 is a system, comprising a wireless communication apparatus according to any of Examples 38 to 45, a display, a radio frequency (RF) transceiver, and one or more RF antennas.

Example 47 is at least one non-transitory computer-readable storage medium comprising a set of wireless communication instructions that, in response to being executed on a computing device, cause the computing device to receive an interference-contingent uplink (UL) transmission invitation identifying a destination device of a downlink (DL) data transmission, estimate a collateral interference resulting at the destination device from a prospective UL data transmission, and determine whether to perform the prospective UL data transmission based on a comparison of the estimated collateral interference with a collateral interference margin for the DL data transmission.

In Example 48, the interference-contingent UL transmission invitation of Example 47 may optionally comprise the collateral interference margin for the DL data transmission.

In Example 49, the at least one non-transitory computer-readable storage medium of any of Examples 47 to 48 may optionally comprise wireless communication instructions that, in response to being executed on the computing device, cause the computing device to overhear a UL message originating from the destination device, the UL message indicating a UL transmit power for the UL message, determine a received signal strength for the UL message, and estimate the collateral interference based on the UL transmit power and the received signal strength.

In Example 50, the at least one non-transitory computer-readable storage medium of any of Examples 47 to 49 may optionally comprise wireless communication instructions that, in response to being executed on the computing device, cause the computing device to determine a minimum transmit power for the prospective UL data transmission, and estimate the collateral interference based on the minimum transmit power.

In Example 51, the at least one non-transitory computer-readable storage medium of any of Examples 47 to 50 may optionally comprise wireless communication instructions that, in response to being executed on the computing device, cause the computing device to perform a random backoff, and determine whether to perform the prospective UL data transmission based on an availability of a wireless channel following the random backoff.

In Example 52, the at least one non-transitory computer-readable storage medium of any of Examples 47 to 51 may optionally comprise wireless communication instructions that, in response to being executed on the computing device, cause the computing device to adjust a duration of the prospective UL data transmission.

In Example 53, the at least one non-transitory computer-readable storage medium of any of Examples 47 to 52 may optionally comprise wireless communication instructions that, in response to being executed on the computing device, cause the computing device to overhear a UL message originating from the destination device, the UL message comprising the collateral interference margin.

In Example 54, the at least one non-transitory computer-readable storage medium of any of Examples 47 to 53 may optionally comprise wireless communication instructions that, in response to being executed on the computing device, cause the computing device to determine a reduced transmit power for the DL data transmission based on the collateral interference margin, and select an alternate modulation and coding scheme (MCS) for the DL data transmission based on the reduced transmit power.

Example 55 is a wireless communication method, comprising receiving an interference-contingent uplink (UL) transmission invitation identifying a destination device of a downlink (DL) data transmission, estimating a collateral interference resulting at the destination device from a prospective UL data transmission, and determining, by a processor circuit, whether to perform the prospective UL data transmission based on a comparison of the estimated collateral interference with a collateral interference margin for the DL data transmission.

In Example 56, the interference-contingent UL transmission invitation of Example 55 may optionally comprise the collateral interference margin for the DL data transmission.

In Example 57, the wireless communication method of any of Examples 55 to 56 may optionally comprise overhearing a UL message originating from the destination device, the UL message indicating a UL transmit power for the UL message, determining a received signal strength for the UL message, and estimating the collateral interference based on the UL transmit power and the received signal strength.

In Example 58, the wireless communication method of any of Examples 55 to 57 may optionally comprise determining a minimum transmit power for the prospective UL data transmission, and estimating the collateral interference based on the minimum transmit power.

In Example 59, the wireless communication method of any of Examples 55 to 58 may optionally comprise performing a random backoff, and determining whether to perform the prospective UL data transmission based on an availability of a wireless channel following the random backoff.

In Example 60, the wireless communication method of any of Examples 55 to 59 may optionally comprise adjusting a duration of the prospective UL data transmission.

In Example 61, the wireless communication method of any of Examples 55 to 60 may optionally comprise overhearing a UL message originating from the destination device, the UL message comprising the collateral interference margin.

In Example 62, the wireless communication method of any of Examples 55 to 61 may optionally comprise determining a reduced transmit power for the DL data transmission based on the collateral interference margin, and selecting an alternate modulation and coding scheme (MCS) for the DL data transmission based on the reduced transmit power.

Example 63 is at least one machine-readable medium comprising a set of instructions that, in response to being executed on a computing device, cause the computing device to perform a wireless communication method according to any of Examples 55 to 62.

Example 64 is an apparatus, comprising means for performing a wireless communication method according to any of Examples 55 to 62.

Example 65 is a system, comprising an apparatus according to Example 64, a display, a radio frequency (RF) transceiver, and one or more RF antennas.

Example 66 is a wireless communication apparatus, comprising means for receiving an interference-contingent uplink (UL) transmission invitation identifying a destination device of a downlink (DL) data transmission, means for estimating a collateral interference resulting at the destination device from a prospective UL data transmission, and means for determining whether to perform the prospective UL data transmission based on a comparison of the estimated collateral interference with a collateral interference margin for the DL data transmission.

In Example 67, the interference-contingent UL transmission invitation of Example 66 may optionally comprise the collateral interference margin for the DL data transmission.

In Example 68, the wireless communication apparatus of any of Examples 66 to 67 may optionally comprise means for overhearing a UL message originating from the destination device, the UL message indicating a UL transmit power for the UL message, means for determining a received signal strength for the UL message, and means for estimating the collateral interference based on the UL transmit power and the received signal strength.

In Example 69, the wireless communication apparatus of any of Examples 66 to 68 may optionally comprise means for determining a minimum transmit power for the prospective UL data transmission, and means for estimating the collateral interference based on the minimum transmit power.

In Example 70, the wireless communication apparatus of any of Examples 66 to 69 may optionally comprise means for performing a random backoff, and means for determining whether to perform the prospective UL data transmission based on an availability of a wireless channel following the random backoff.

In Example 71, the wireless communication apparatus of any of Examples 66 to 70 may optionally comprise means for adjusting a duration of the prospective UL data transmission.

In Example 72, the wireless communication apparatus of any of Examples 66 to 71 may optionally comprise means for overhearing a UL message originating from the destination device, the UL message comprising the collateral interference margin.

In Example 73, the wireless communication apparatus of any of Examples 66 to 72 may optionally comprise means for determining a reduced transmit power for the DL data transmission based on the collateral interference margin, and means for selecting an alternate modulation and coding scheme (MCS) for the DL data transmission based on the reduced transmit power.

Example 74 is a system, comprising a wireless communication apparatus according to any of Examples 66 to 73, a display, a radio frequency (RF) transceiver, and one or more RF antennas.

Example 75 is a wireless communication apparatus, comprising logic, at least a portion of which is in hardware, the logic to determine one or more channel characteristics of a downlink (DL) channel, determine a collateral interference margin for a DL data transmission based on the one or more channel characteristics of the DL channel, and send an uplink (UL) message comprising the collateral interference margin.

In Example 76, the logic of Example 75 may optionally determine the collateral interference margin based on the one or more channel characteristics and on a modulation and coding scheme (MCS) for the DL data transmission.

In Example 77, the one or more channel characteristics of any of Examples 75 to 76 may optionally comprise a signal-to-noise ratio (SNR) for the DL channel.

In Example 78, the one or more channel characteristics of any of Examples 75 to 77 may optionally comprise a noise level for the DL channel.

In Example 79, the logic of any of Examples 75 to 78 may optionally include a UL transmit power value in the UL message.

In Example 80, the UL message of any of Examples 75 to 79 may optionally comprise a clear-to-send (CTS) message.

In Example 81, the logic of any of Examples 75 to 80 may optionally receive the DL data transmission over the DL channel.

In Example 82, the logic of any of Examples 75 to 81 may optionally send an acknowledgment of the DL data transmission.

Example 83 is a system, comprising a wireless communication apparatus according to any of Examples 75 to 82, a display, a radio frequency (RF) transceiver, and one or more RF antennas.

Example 84 is at least one non-transitory computer-readable storage medium comprising a set of wireless communication instructions that, in response to being executed on a computing device, cause the computing device to determine one or more channel characteristics of a downlink (DL) channel, determine a collateral interference margin for a DL data transmission based on the one or more channel characteristics of the DL channel, and send an uplink (UL) message comprising the collateral interference margin.

In Example 85, the at least one non-transitory computer-readable storage medium of Example 84 may optionally comprise wireless communication instructions that, in response to being executed on the computing device, cause the computing device to determine the collateral interference margin based on the one or more channel characteristics and on a modulation and coding scheme (MCS) for the DL data transmission.

In Example 86, the one or more channel characteristics of any of Examples 84 to 85 may optionally comprise a signal-to-noise ratio (SNR) for the DL channel.

In Example 87, the one or more channel characteristics of any of Examples 84 to 86 may optionally comprise a noise level for the DL channel.

In Example 88, the at least one non-transitory computer-readable storage medium of any of Examples 84 to 87 may optionally comprise wireless communication instructions that, in response to being executed on the computing device, cause the computing device to include a UL transmit power value in the UL message.

In Example 89, the UL message of any of Examples 84 to 88 may optionally comprise a clear-to-send (CTS) message.

In Example 90, the at least one non-transitory computer-readable storage medium of any of Examples 84 to 89 may optionally comprise wireless communication instructions that, in response to being executed on the computing device, cause the computing device to receive the DL data transmission over the DL channel.

In Example 91, the at least one non-transitory computer-readable storage medium of any of Examples 84 to 90 may optionally comprise wireless communication instructions that, in response to being executed on the computing device, cause the computing device to send an acknowledgment of the DL data transmission.

Example 92 is a wireless communication method, comprising determining one or more channel characteristics of a downlink (DL) channel, determining, by a processor circuit, a collateral interference margin for a DL data transmission based on the one or more channel characteristics of the DL channel, and sending an uplink (UL) message comprising the collateral interference margin.

In Example 93, the wireless communication method of Example 92 may optionally comprise determining the collateral interference margin based on the one or more channel characteristics and on a modulation and coding scheme (MCS) for the DL data transmission.

In Example 94, the one or more channel characteristics of any of Examples 92 to 93 may optionally comprise a signal-to-noise ratio (SNR) for the DL channel.

In Example 95, the one or more channel characteristics of any of Examples 92 to 94 may optionally comprise a noise level for the DL channel.

In Example 96, the wireless communication method of any of Examples 92 to 95 may optionally comprise including a UL transmit power value in the UL message.

In Example 97, the UL message of any of Examples 92 to 96 may optionally comprise a clear-to-send (CTS) message.

In Example 98, the wireless communication method of any of Examples 92 to 97 may optionally comprise receiving the DL data transmission over the DL channel.

In Example 99, the wireless communication method of any of Examples 92 to 98 may optionally comprise sending an acknowledgment of the DL data transmission.

Example 100 is at least one machine-readable medium comprising a set of instructions that, in response to being executed on a computing device, cause the computing device to perform a wireless communication method according to any of Examples 92 to 99.

Example 101 is an apparatus, comprising means for performing a wireless communication method according to any of Examples 92 to 99.

Example 102 is a system, comprising an apparatus according to Example 101, a display, a radio frequency (RF) transceiver, and one or more RF antennas.

Example 103 is a wireless communication apparatus, comprising means for determining one or more channel characteristics of a downlink (DL) channel, means for determining a collateral interference margin for a DL data transmission based on the one or more channel characteristics of the DL channel, and means for sending an uplink (UL) message comprising the collateral interference margin.

In Example 104, the wireless communication apparatus of Example 103 may optionally comprise means for determining the collateral interference margin based on the one or more channel characteristics and on a modulation and coding scheme (MCS) for the DL data transmission.

In Example 105, the one or more channel characteristics of any of Examples 103 to 104 may optionally comprise a signal-to-noise ratio (SNR) for the DL channel.

In Example 106, the one or more channel characteristics of any of Examples 103 to 105 may optionally comprise a noise level for the DL channel.

In Example 107, the wireless communication apparatus of any of Examples 103 to 106 may optionally comprise means for including a UL transmit power value in the UL message.

In Example 108, the UL message of any of Examples 103 to 107 may optionally comprise a clear-to-send (CTS) message.

In Example 109, the wireless communication apparatus of any of Examples 103 to 108 may optionally comprise means for receiving the DL data transmission over the DL channel.

In Example 110, the wireless communication apparatus of any of Examples 103 to 109 may optionally comprise means for sending an acknowledgment of the DL data transmission.

Example 111 is a system, comprising a wireless communication apparatus according to any of Examples 103 to 110, a display, a radio frequency (RF) transceiver, and one or more RF antennas.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively.

Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    logic, at least a portion of which is in hardware, the logic to initiate a downlink (DL) transmission procedure for sending a DL data transmission, and during the DL transmission procedure, send an interference-contingent uplink (UL) transmission invitation identifying a destination of the DL data transmission and begin receiving a UL data transmission in response to the interference-contingent UL transmission invitation, the interference-contingent UL transmission invitation comprising a collateral interference margin for the DL data transmission.

2. The apparatus of claim 1, the interference-contingent UL transmission invitation comprising a request-to-send (RTS).

3. The apparatus of claim 1, the interference-contingent UL transmission invitation comprising an invitation for a specific remote device to perform UL transmission to the apparatus.

4. The apparatus of claim 1, the interference-contingent UL transmission invitation comprising a non-specific invitation for consideration by any of a plurality of remote devices.

5. The apparatus of claim 1, the logic to concurrently send an acknowledgment of the UL data transmission and receive an acknowledgment of the DL data transmission.

6. At least one non-transitory computer-readable storage medium comprising a set of instructions that, in response to being executed on a computing device, cause the computing device to:
    initiate a downlink (DL) transmission procedure for sending a DL data transmission; and
    during the DL transmission procedure:
        send an interference-contingent uplink (UL) transmission invitation identifying a destination of the DL data transmission, the interference-contingent UL transmission invitation comprising a collateral interference margin for the DL data transmission; and
        begin receiving a UL data transmission in response to the interference-contingent UL transmission invitation.

7. The at least one non-transitory computer-readable storage medium of claim 6, the interference-contingent UL transmission invitation comprising a request-to-send (RTS).

8. The at least one non-transitory computer-readable storage medium of claim 6, the interference-contingent UL transmission invitation comprising an invitation for a specific remote device to perform UL transmission to the apparatus.

9. The at least one non-transitory computer-readable storage medium of claim 6, the interference-contingent UL transmission invitation comprising a non-specific invitation for consideration by any of a plurality of remote devices.

10. The at least one non-transitory computer-readable storage medium of claim 6, comprising instructions that, in response to being executed on the computing device, cause the computing device to concurrently send an acknowledgment of the UL data transmission and receive an acknowledgment of the DL data transmission.

11. An apparatus, comprising:
logic, at least a portion of which is in hardware, the logic to receive an interference-contingent uplink (UL) transmission invitation identifying a destination device of a downlink (DL) data transmission, estimate a collateral interference resulting at the destination device from a prospective UL data transmission, and determine whether to perform the prospective UL data transmission based on a comparison of the estimated collateral interference with a collateral interference margin for the DL data transmission.

12. The apparatus of claim 11, the interference-contingent UL transmission invitation comprising the collateral interference margin for the DL data transmission.

13. The apparatus of claim 11, the logic to overhear a UL message originating from the destination device, the UL message indicating a UL transmit power for the UL message, determine a received signal strength for the UL message, and estimate the collateral interference based on the UL transmit power and the received signal strength.

14. The apparatus of claim 11, the logic to determine a minimum transmit power for the prospective UL data transmission and estimate the collateral interference based on the minimum transmit power.

15. The apparatus of claim 11, the logic to perform a random backoff and determine whether to perform the prospective UL data transmission based on an availability of a wireless channel following the random backoff.

16. The apparatus of claim 11, the logic to adjust a duration of the prospective UL data transmission.

17. The apparatus of claim 11, comprising:
a display;
a radio frequency (RF) transceiver; and
one or more RF antennas.

18. At least one non-transitory computer-readable storage medium comprising a set of instructions that, in response to being executed on a computing device, cause the computing device to:
receive an interference-contingent uplink (UL) transmission invitation identifying a destination device of a downlink (DL) data transmission;
estimate a collateral interference resulting at the destination device from a prospective UL data transmission; and
determine whether to perform the prospective UL data transmission based on a comparison of the estimated collateral interference with a collateral interference margin for the DL data transmission.

19. The at least one non-transitory computer-readable storage medium of claim 18, the interference-contingent UL transmission invitation comprising the collateral interference margin for the DL data transmission.

20. The at least one non-transitory computer-readable storage medium of claim 18, comprising instructions that, in response to being executed on the computing device, cause the computing device to:
overhear a UL message originating from the destination device, the UL message indicating a UL transmit power for the UL message;
determine a received signal strength for the UL message; and
estimate the collateral interference based on the UL transmit power and the received signal strength.

21. The at least one non-transitory computer-readable storage medium of claim 18, comprising instructions that, in response to being executed on the computing device, cause the computing device to:
determine a minimum transmit power for the prospective UL data transmission; and
estimate the collateral interference based on the minimum transmit power.

22. The at least one non-transitory computer-readable storage medium of claim 18, comprising instructions that, in response to being executed on the computing device, cause the computing device to:
perform a random backoff; and
determine whether to perform the prospective UL data transmission based on an availability of a wireless channel following the random backoff.

23. The at least one non-transitory computer-readable storage medium of claim 18, comprising instructions that, in response to being executed on the computing device, cause the computing device to adjust a duration of the prospective UL data transmission.

* * * * *